US011474592B2

(12) United States Patent
Bazant et al.

(10) Patent No.: US 11,474,592 B2
(45) Date of Patent: Oct. 18, 2022

(54) DAISY-CHAINED POWER-OVER-ETHERNET (POE) NETWORK

(71) Applicant: Honeywell International Inc., Morris Plains, NJ (US)

(72) Inventors: Jiri Bazant, Nova Paka (CZ); Ivo Chromy, Rajhrad (CZ); Miroslav Mikulica, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 189 days.

(21) Appl. No.: 16/574,006

(22) Filed: Sep. 17, 2019

(65) Prior Publication Data
US 2021/0081018 A1    Mar. 18, 2021

(51) Int. Cl.
*G06F 1/329*      (2019.01)
*G05B 13/02*     (2006.01)
*H04L 12/10*     (2006.01)

(52) U.S. Cl.
CPC ........... *G06F 1/329* (2013.01); *G05B 13/021* (2013.01); *H04L 12/10* (2013.01)

(58) Field of Classification Search
CPC ........ G06F 1/329; G05B 13/021; H04L 12/10
USPC ...................................................... 700/276
See application file for complete search history.

(56) References Cited

U.S. PATENT DOCUMENTS

| | | | | |
|---|---|---|---|---|
| 7,818,461 | B2* | 10/2010 | Weber | G06F 1/26 709/251 |
| 8,428,054 | B2 | 4/2013 | Miller | |
| 9,832,028 | B2* | 11/2017 | Picard | G06F 1/3206 |
| 2007/0041568 | A1* | 2/2007 | Ghoshal | H04L 12/10 379/324 |
| 2012/0120306 | A1* | 5/2012 | Schindler | H02J 1/14 348/372 |
| 2012/0130555 | A1* | 5/2012 | Jelinek | G01D 4/004 700/291 |
| 2012/0131372 | A1* | 5/2012 | Hibi | H04L 12/10 713/340 |

(Continued)

FOREIGN PATENT DOCUMENTS

| | | |
|---|---|---|
| EP | 2321584 A1 | 2/2010 |
| EP | 2202914 A1 | 6/2010 |

OTHER PUBLICATIONS

Extended European Search Report for Application No. 20195382.5-1216 dated Feb. 11, 2021.

*Primary Examiner* — Thomas C Lee
*Assistant Examiner* — Charles Cai
(74) *Attorney, Agent, or Firm* — Seager, Tufte & Wickhem, LLP

(57) ABSTRACT

A system that maintains power consumption of a network to a predefined limit. A plurality of elements such as components, nodes and modules may be connected in a daisy chain configuration. Power may be inserted to one or more of the elements which may proceed down the chain to be consumed by the one or more elements. However, there a limit as to the total amount of energy that may be consumed at the same time. Thus, power to the elements may be scheduled so that the limit is not exceeded by at any one time. At the same time, communications may proceed through that chain from element to element. An example of the present system may be a power over a network (PoE).

18 Claims, 24 Drawing Sheets

(56) References Cited

U.S. PATENT DOCUMENTS

| | | | |
|---|---|---|---|
| 2012/0271477 A1* | 10/2012 | Okubo | H04L 12/10 700/297 |
| 2016/0191256 A1* | 6/2016 | Wendt | G06F 1/266 713/300 |
| 2018/0314219 A1* | 11/2018 | Gamroth | G06F 1/26 |
| 2019/0081805 A1* | 3/2019 | Frezza | H04L 12/10 |

* cited by examiner

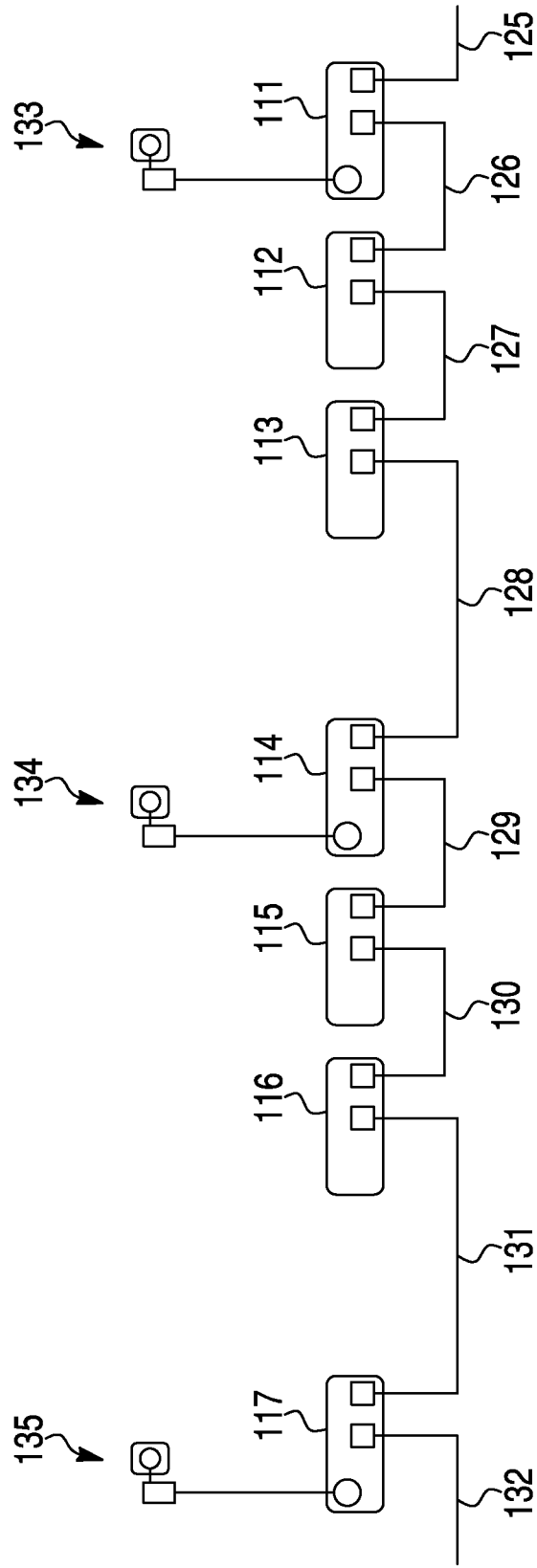

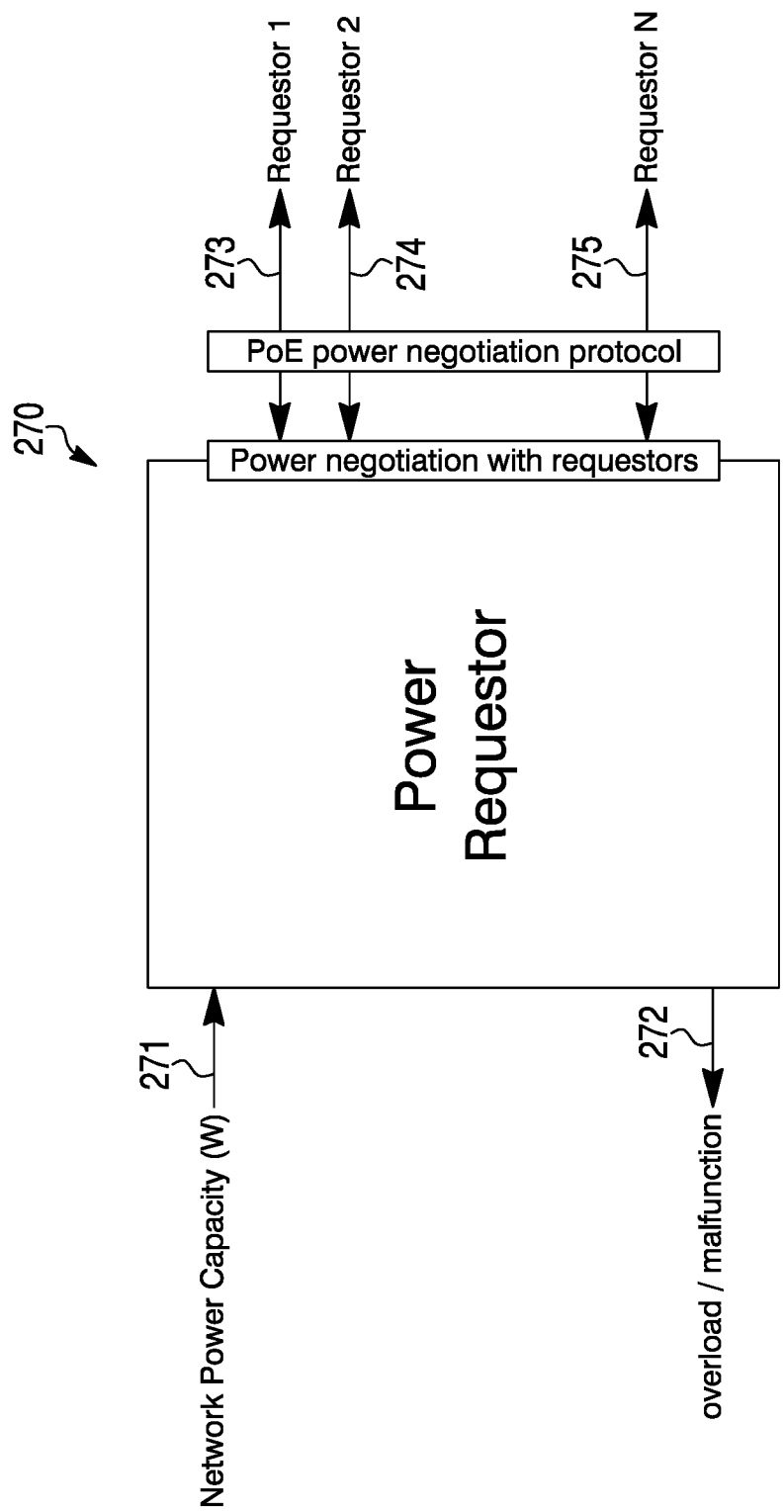

DAISY-CHAINED POWER-OVER-ETHERNET (POE) NETWORK

BACKGROUND

The present disclosure pertains to networks and their power consumption limits.

SUMMARY

The disclosure reveals examples of load shedding for daisy-chained power-over-Ethernet (PoE) networks. For instance a system may maintain power consumption of a network to a predefined limit. A plurality of elements such as components, nodes and modules may be connected in a daisy chain configuration. Power may be inserted to one or more of the elements which may proceed down the chain to be consumed by the one or more elements. However, there is a limit as to the total amount of energy that may be consumed at the same time. Thus, power to the elements may be scheduled so that the limit is not exceeded by at any one time. At the same time, communications may proceed through that chain from element to element. An example of the present system may be a power over a network (PoE).

BRIEF DESCRIPTION OF THE DRAWING

FIG. 9A is a diagram like that of FIG. 9 but with removal of power injectors and providing a connection of power sources to their respective nodes;

FIG. 20 is a diagram of power allocator.

DESCRIPTION

Figure 1:
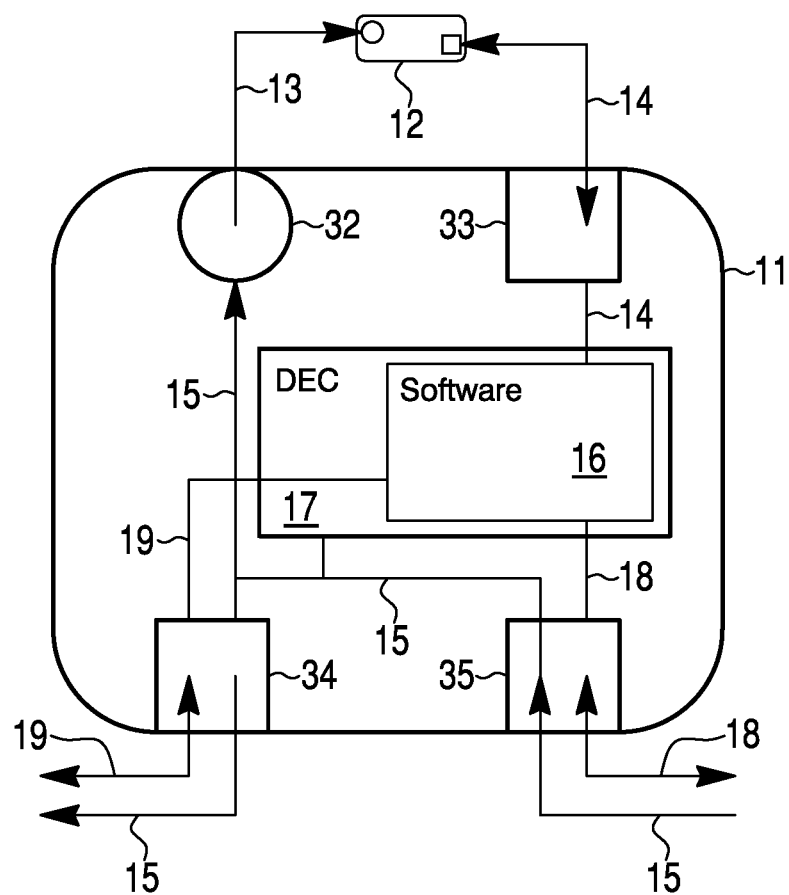
FIG. 1 is a diagram of an external daisy chain power-over-Ethernet (PoE) module for an Ethernet made with an independent power supply utilizing a present system.

The present system and approach may incorporate one or more processors, computers, controllers, user interfaces, wireless and/or wire connections, and/or the like such as cables or lines, in an implementation described and/or shown herein. Relative to the present application herein, the term "wire" may mean one or more wires, lines, cables, multiple conductors, single conductors, and so on.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

An efficient HVAC system may contain many field devices, each requiring a connection to a communications network and power supply. The devices may be distributed over large area. Battery power and wireless communication are not necessarily applicable in buildings and wired networks grow into complex systems requiring lots of networking components and fixtures, long cabling and cables converging into wide cable harness, especially for star architecture.

Generally, a daisy-chained network and a combination of data communication with power supply into one cable may be the best alternative. Length of the cabling may be minimal. Only one cable may be used, not longer than the pipework and can easily follow the pipework path. There may be only one data and power supply hub per area.

Power over Ethernet or PoE describes any of several standard or ad-hoc systems which pass electric power along with data on twisted pair Ethernet cabling. This allows a single cable to provide both data connection and electric power to devices such as wireless access points, IP cameras, and VoIP phones. Ethernet and Wi-Fi are the two most common technologies in use for local area networks.

Specifically, a daisy-chained power-over-Ethernet (PoE) may be a best candidate for a context of the present system due to its widespread use. This approach may make installation as simple as possible and minimize its cost. PoE may be considered today's trend in building automation.

However, a technical problem may be a limited power capacity of a daisy-chained PoE, limiting its use for a very small area with a few nodes or necessitating a use of lots of power injectors over the network.

The present approach may allow one to rely on a PoE as an only means of networking, and a most widespread (i.e., cheapest) network in its simplest geometric architecture with the shortest possible cabling following the pipework and requiring minimum building fixtures.

There may be a technical issue that the present approach and system may solve. The present approach and system may have a uniqueness in a solution. Components in powered devices may be devoted to consuming continuously a small amount of power and devoted to consuming higher peak power for only limited time intervals. Generally, for example, actuators may consume peak power.

Any form of daisy-chained power supply used in building automation by others may be limited to a certain number of nodes in order that a sum of peak power consumption of each component of all nodes does not exceed a capacity of a power supply network. Such a limited daisy-chained network may limit a number of nodes; thus, there may be no coverage of a natural area of a building without a use of many power injectors or a use of many separated daisy-chains. The network simplicity benefit therefore disappears, which is considered a reason why it has not been widespread until today.

The present approach may consist of scheduling the consumption of peak power consuming components, mainly actuators, in such a way, that peak power consumption of whole network approaches the long term average consumption of the network. Thanks to that, the condition limiting the number of nodes may change so that the average consumption of the network can't exceed the capacity of power supply, thereby increasing the limit for a number of nodes several times.

The present approach may utilize HVAC specifics which are a thermal inertia of a building thereby allowing consumption scheduling.

Benefits may be generated by the present system. The system may increase a number of nodes coverable by one daisy-chained PoE, or decrease the number of power injectors necessary and eliminate the need for the valves at all. In case of valves, cables rated at lower power may even be used.

The present system and approach may allow PoE variant of HVAC control system solutions with the simplest and cheapest PoE architecture possible and thus cheaper installation costs for the solution.

In the broadest definition, the present system and approach may apply to any daisy-chained PoE application. The system may be expected to limit the application to HVAC or home and building automation. The narrowest definition of the system may apply only to hydronics or hydronic actuators.

The PoE module may acquire information about a node's permanent and peak power consumption quantities. Consumption components may be scheduled by switching and/or modulation, and when they are desired to run, and what the costs (e.g., of comfort, energy, wear, and so on) are for changing the times to run. By applying optimization schedules, switches and modulation, the total power consumption should not exceed the PoE maximum while none or minimal impairment in a comfort perception (HVAC) or system functions should result.

The module may run firmware for doing the computations and communicating with the respective nodes and other modules, and nodes in the network. The scheduling may be taken on by one module or be distributed over all.

The module may be external, wired to the node or internal, inside the common housing or part of the same circuit board or software module sharing the same processor.

The present system may have a software component. The stack level may be an edge, that is, a hardware device with embedded software which can be connected securely to the cloud via a wired or wireless connection. The software type may be embedded, that is, software that runs in a device/unit (e.g., firmware).

FIG. 1 is a diagram of an external daisy chain power-over-Ethernet (PoE) module 11 for a separate communication and power supply line. Any Ethernet node 12 may have connections 13 and 14 with module 11. Connection 13 may be power supply line and a device 12 may be power supplied from it. Connection 14 may be a two-way data communication line. Power inserted into connection 13 may be taken from PoE power supply line 15. Connection 14 may go to software module 16 of a digital electronic component (DEC) 17 at module 11. A power inserted into DEC 17 may be taken from line 15. A two-way data communication line 18 may be connected to software 16. A two-way connection line 19 may go to software module 16. Terminal 32 may be a through-put for lines 15 and 13 or may contain a power convertor. Terminal 33 may be a through-put for line 14. Terminal 34 may be a through-put for lines 15 and 19 or may contain a power convertor for line 15. Terminal 35 may be through-put for lines 15 and 18 or may contain a power convertor for line 15. Line 15 may be a PoE power supply line that may go into module 11 via terminal 35 and then out of module 11 via terminals 32 and 34.

Figure 2:
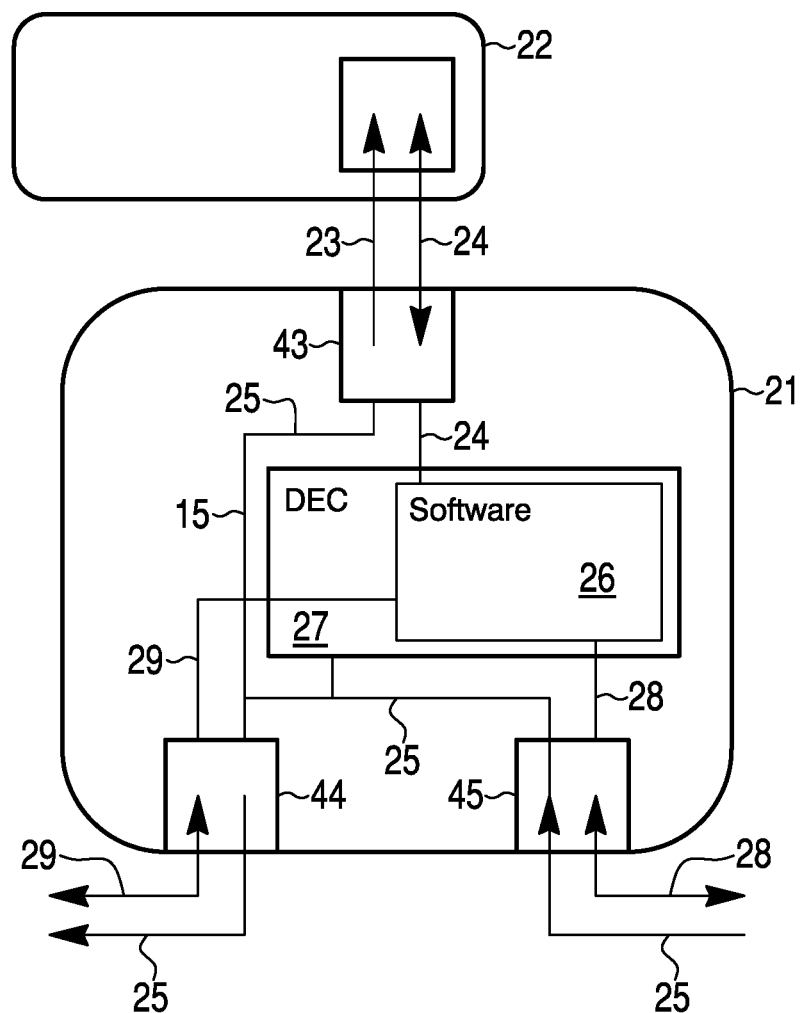
FIG. 2 is a diagram of another external daisy chain PoE module with PoE supply utilizing a present system.

FIG. 2 is a diagram of another external daisy chain PoE module 21 utilizing a present system. Module 21 may be connected to any Ethernet node 22 with lines 23 and 24. Line 24 of terminal 43 may be a two-way data communication line. Terminal 43 may be a through-put or there may be power convertor for line 25 and line 23. Connection or line 23 may be a power supply line and a device 22 may be power supplied from it. Terminal 43 may also be a through-put for line 24, which, besides Ethernet node 22, is connected to a software module 26. Terminal 44 may be a through-put for line 25 and line 29 or may contain power convertor for line 25. Line 25 may be a PoE power supply line that may go into module 21 via terminal 45 and then out of module 21 via terminals 43 and 44. Line 29 of terminal 44 may be a two-way connection to software module 26. Terminal 45 may be a through-put for line 25 and line 28 or may contain power convertor for line 25. Line 28 through terminal 45 may be a two-way data communication line to software module 26 that is a part of digital electronic component (DEC) 27. A power inserted into DEC 27 may be taken from line 25.

Figure 2A:
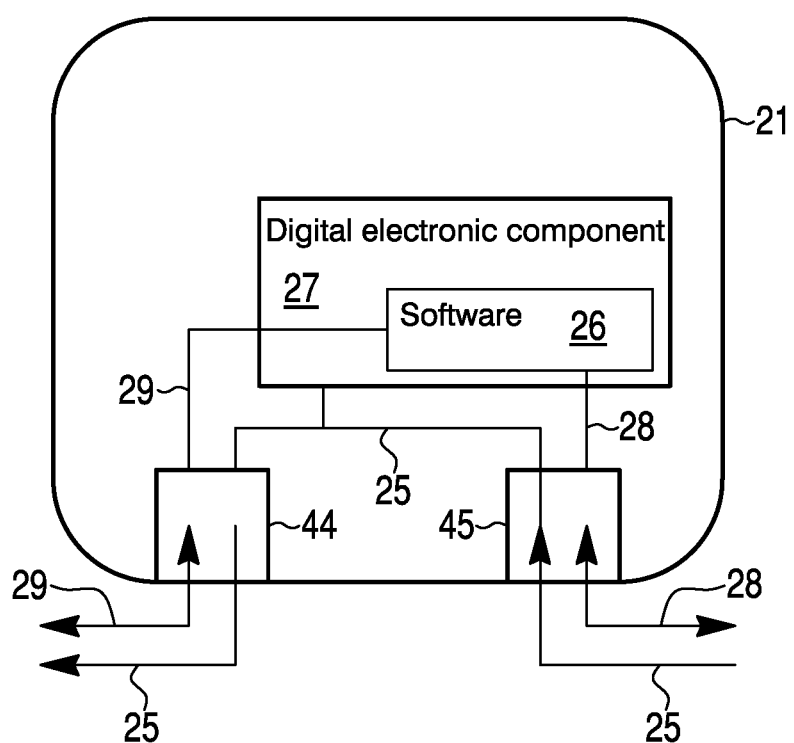
FIG. 2A is a diagram of an external daisy chain PoE module like that of the module in FIG. 2 but without the Ethernet node and its corresponding terminals.

FIG. 2A is a diagram of the daisy chain PoE module 21 of FIG. 2 but without items 22, 23, 24 and 43. Module 11 of FIG. 1 may similarly be equipped without items 12, 13, 14, 32 and 33.

Figure 3:
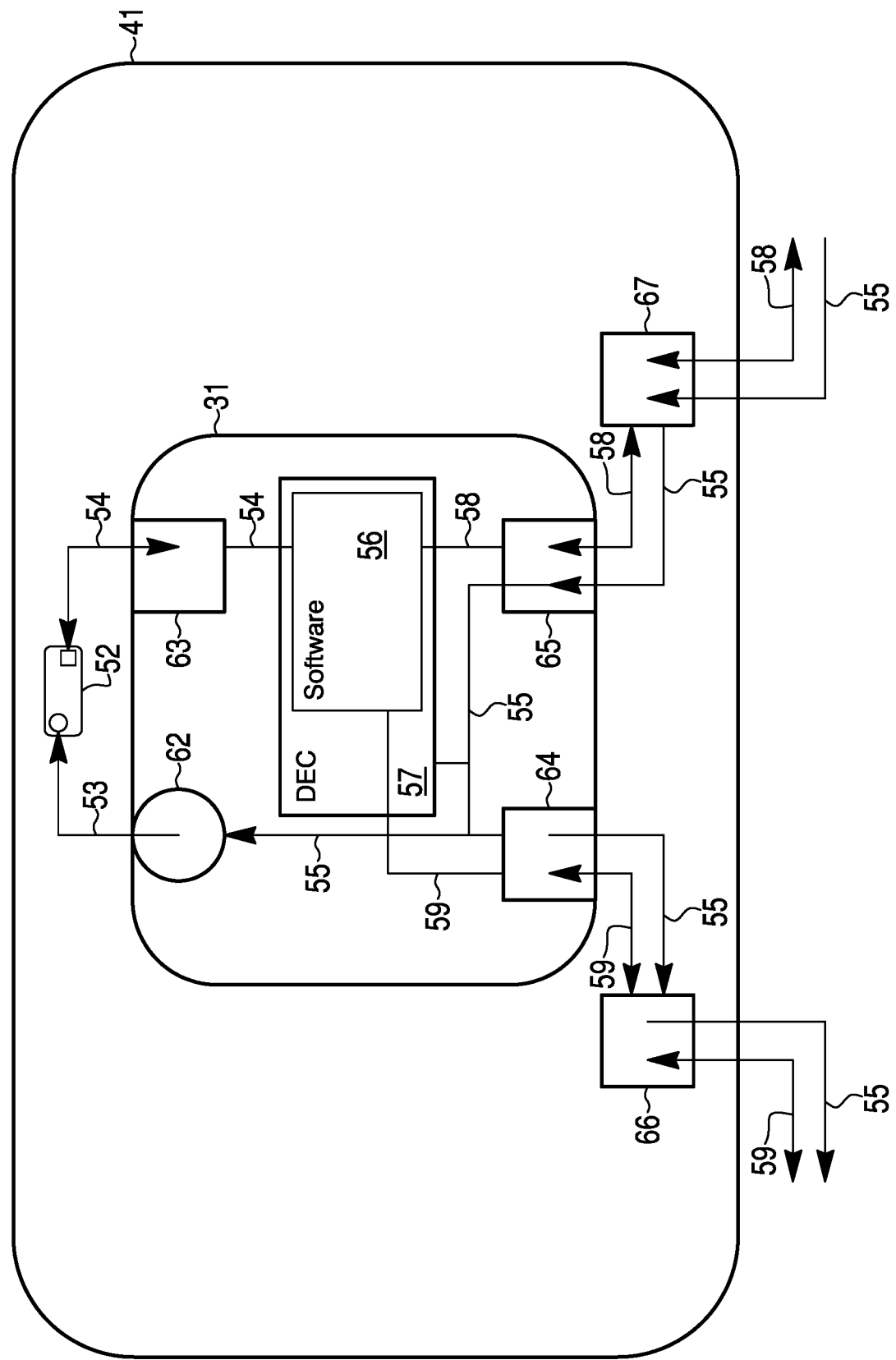
FIG. 3 is a diagram of an internal daisy-chain PoE module utilizing a present system.

FIG. 3 is a diagram of an internal daisy-chain PoE module 41. Within module 41 may be a daisy-chain PoE module 31. An Ethernet node 52 may be connected via a line 53 to a through-put terminal 62, which is connected to a line 55. Ethernet node 52 may also be connected via a line 54 to a terminal 63. Line 54 may go from terminal 63 to a software module 56 which may be a part of DEC 57. A line 58 may go from software module 56 to a terminal 65. A line 59 may go from software module 56 to a terminal 64. Line 55 may also be connected to terminal 64 and terminal 65.

To connect internal daisy-chain PoE module 31 to outside of enclosure or module 41, another set of terminals 67 and 68 may be used. Line 55 may go from terminal 65 to terminal 67. From terminal 67, line 55 may go outside of internal daisy-chain PoE module 41 to a PoE power supply line 58. Line 55 may also go from terminal 64 to terminal 66 which may permit line 55 to go outside of module 41. Line 58 may go from terminal 65 to terminal 67. From terminal 67, line 58 may go outside of module 41 as a two-way data communication line. Line 59 may go from terminal 64 to terminal 66 which may permit line 59 to go outside of module 41. Lines 55 and 53 have a flow of electric power and their arrows show a direction from electric power source to electric supplied appliance. Module 31 of FIG. 3, like module 21 of FIG. 2A, may be equipped without items 52, 53, 54, 62 and 63.

Figure 4:
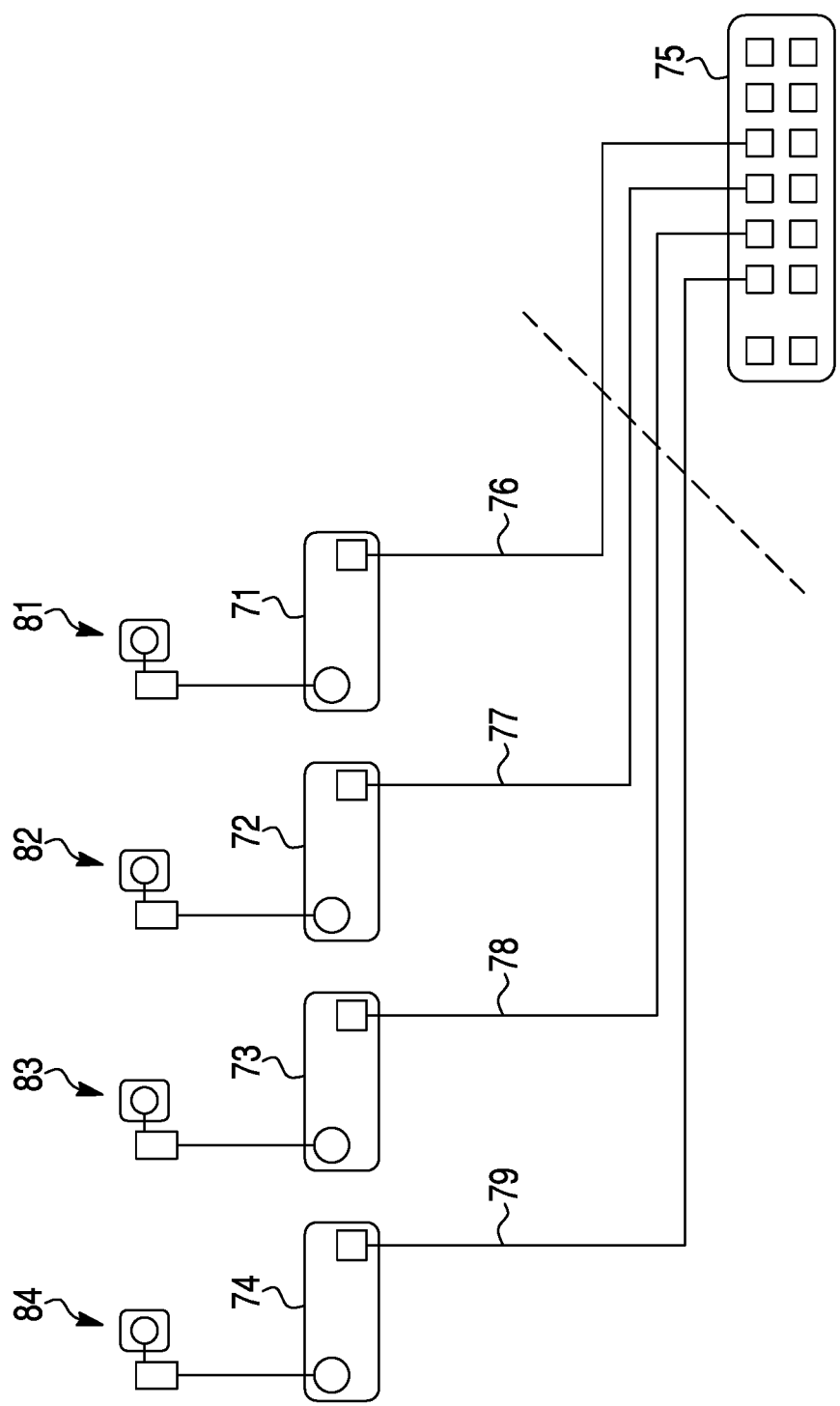
FIG. 4 is a diagram of a star network architecture with independent power supplies.

FIG. 4 is a diagram of a star network architecture with independent power supplies. Nodes 71, 72, 73 and 74 may be connected to an Ethernet hub 75 via cables 76, 77, 78 and 79, respectively. There may be more or fewer nodes and cables. Each of nodes 71-74 may have a power connection to electric power source 81, 82, 83 and 84, respectively. There may be long cables 76-79 that converge into a wider cable harness closer to hub 75. There may be strong and big fixtures and cable collectors, which follow a pipe work path in a situation of hydronics.

Figure 5:
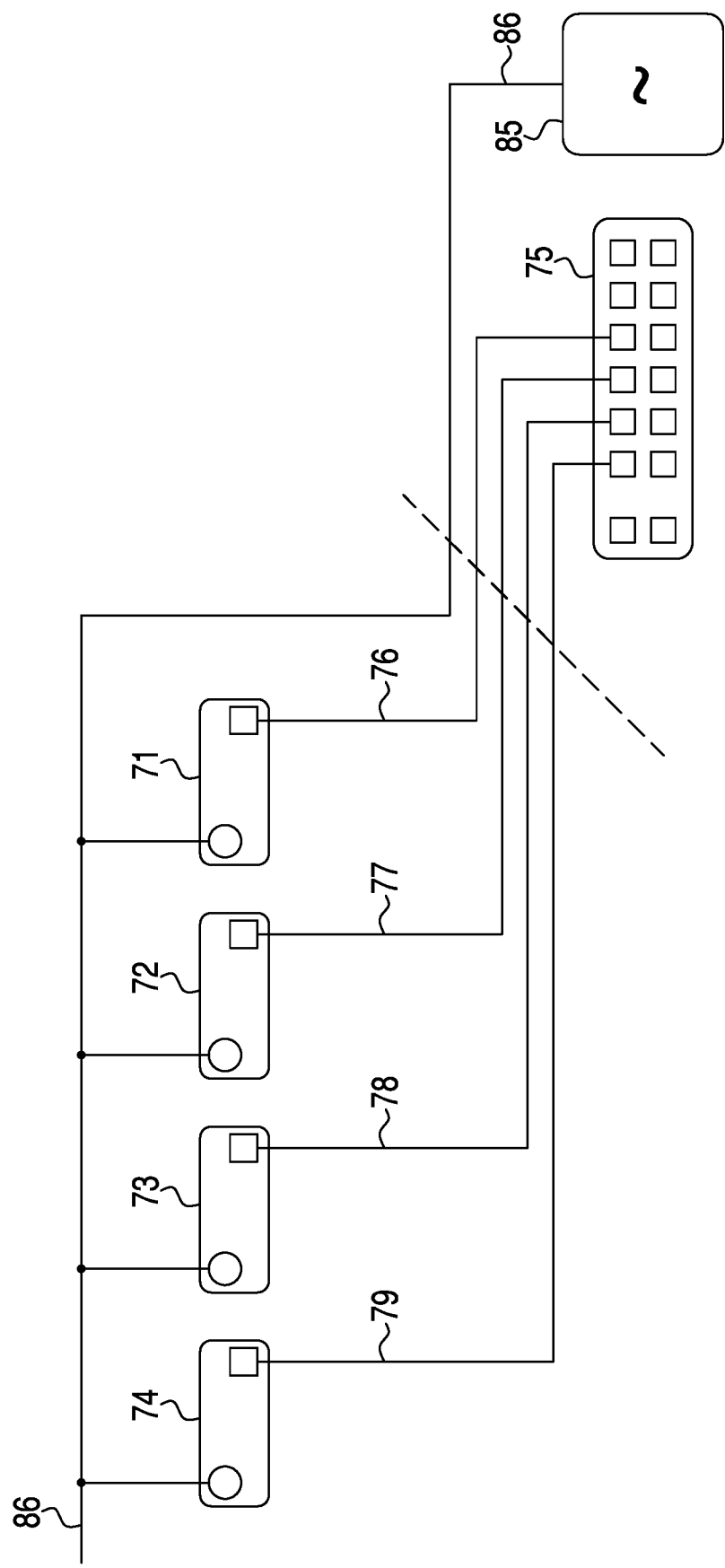
FIG. 5 is a diagram of a star network architecture with a common power supply.

FIG. 5 is a diagram of a star network architecture with a common power supply. Like the diagram of FIG. 4, there may be nodes 71, 72, 73 and 74 connected to an Ethernet hub 75, via cables 76, 77, 78 and 79, respectively. Power may be provided by a strong common power source 85 via a wire or cable 86 to nodes 71 through 74. Similar to FIG. 4, cables 76-79 may converge into a wider cable harness closer to hub 75. There may be strong and big fixtures and cable collectors, which follow a pipe work path in view of a hydronics arrangement.

Figure 6:
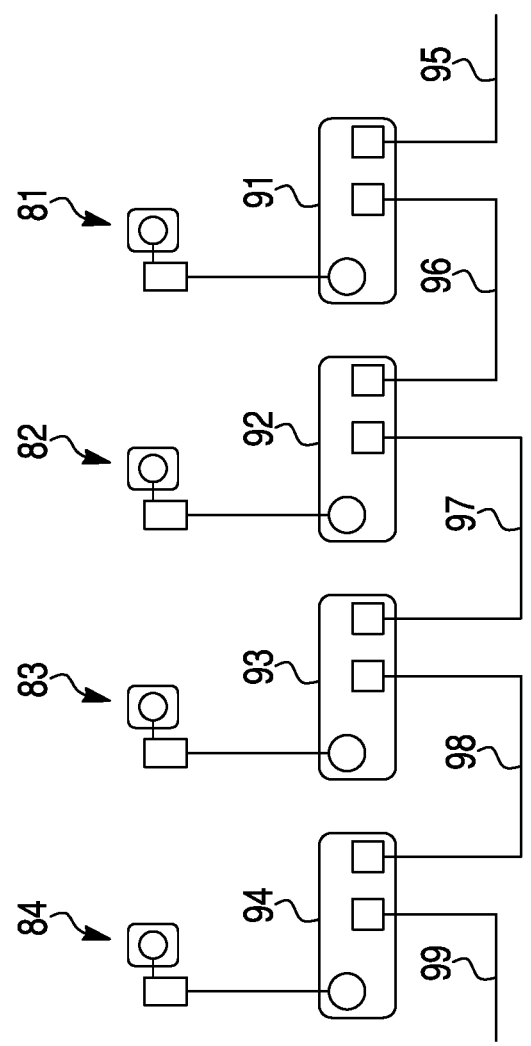
FIG. 6 is a diagram of a daisy-chained Ethernet nodes, which may be independently powered, respectively, with wall sockets and power adaptors.

FIG. 6 is a diagram of a daisy-chained Ethernet nodes 91, 92, 93 and 94, which may be independently powered, respectively, with electric power sources 81, 82, 83 and 84. The daisy chain connections may incorporate cable or wire 95 connected node 91, wire 96 between node 91 and node 92, wire 97 between node 92 and node 93, wire 98 between node 93 and node 94, and a wire 99 for connection between node 94 and another possible node. The arrangement in FIG. 6 may result in short cabling. In a hydronics situation following a pipe work path, fixtures and cable collectors may be relatively small and inexpensive.

Figure 7:
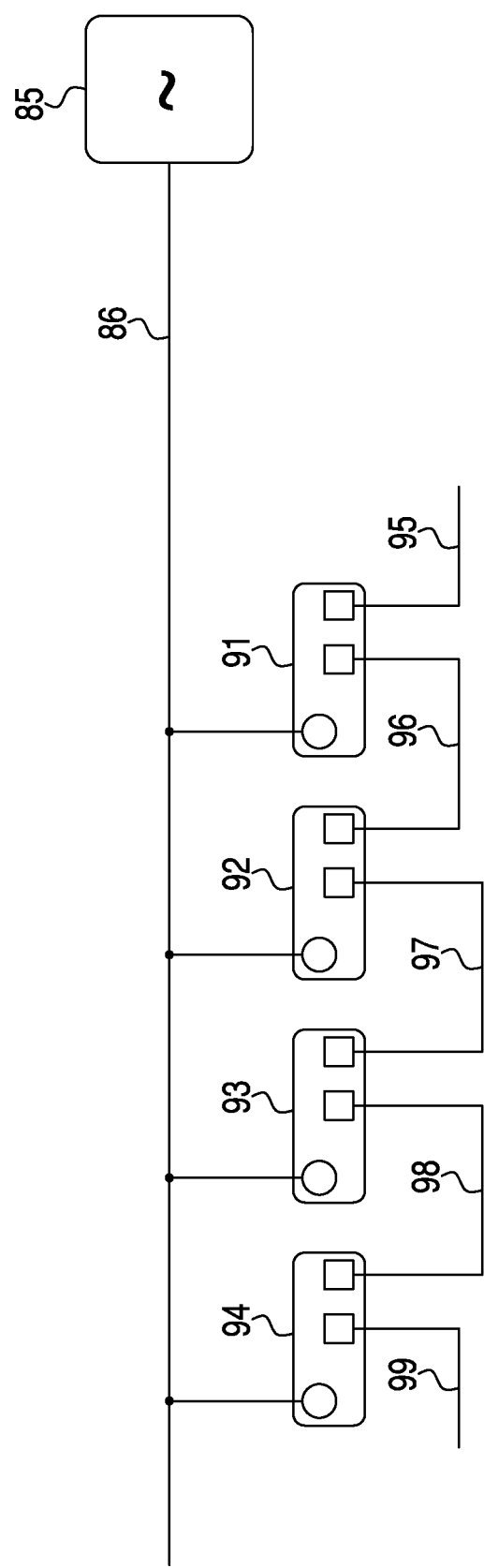
FIG. 7 is a diagram of daisy-chained Ethernet nodes with a common power supply.

FIG. 7 is a diagram of daisy-chained Ethernet nodes 91, 92, 93 and 94 with daisy-chain connecting wires 95-99, respectively, like those shown in FIG. 6. Nodes 91 through 94 may be powered with a strong power source 85 via a cable or line 86 to nodes 91-94. The arrangement in FIG. 7 may have short but doubled cabling. In a situation of hydronics, cabling following a pipe work path, fixtures and cable collectors may be relatively small and inexpensive.

Figure 8:
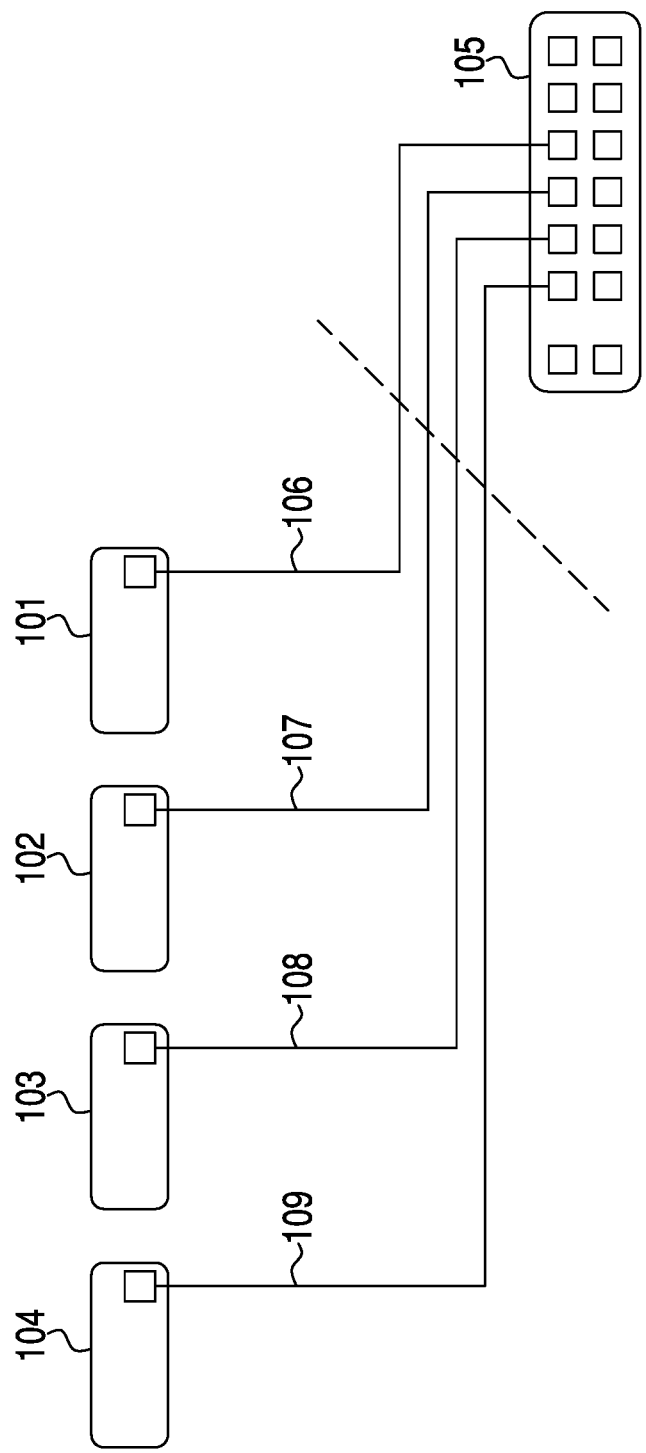
FIG. 8 is a diagram of a star-network architecture of power-over-Ethernet nodes each of which may be connected via lines to a PoE hub.

FIG. 8 is a diagram of a star-network architecture of power-over-Ethernet nodes 101, 102, 103 and 104. Each of the nodes 101-104, may be connected via lines 106, 107, 108 and 109, respectively, to a PoE hub 105. This arrangement may involve long cabling converging into a wide cable harness that gets wider when closer to hub 105. There may be strong and big fixtures and cable collectors, in a hydronics situation following a pipe work path. PoE hub 105 may be expensive. A price per port may be similar to a price of an only daisy-chained PoE hub.

Figure 9:
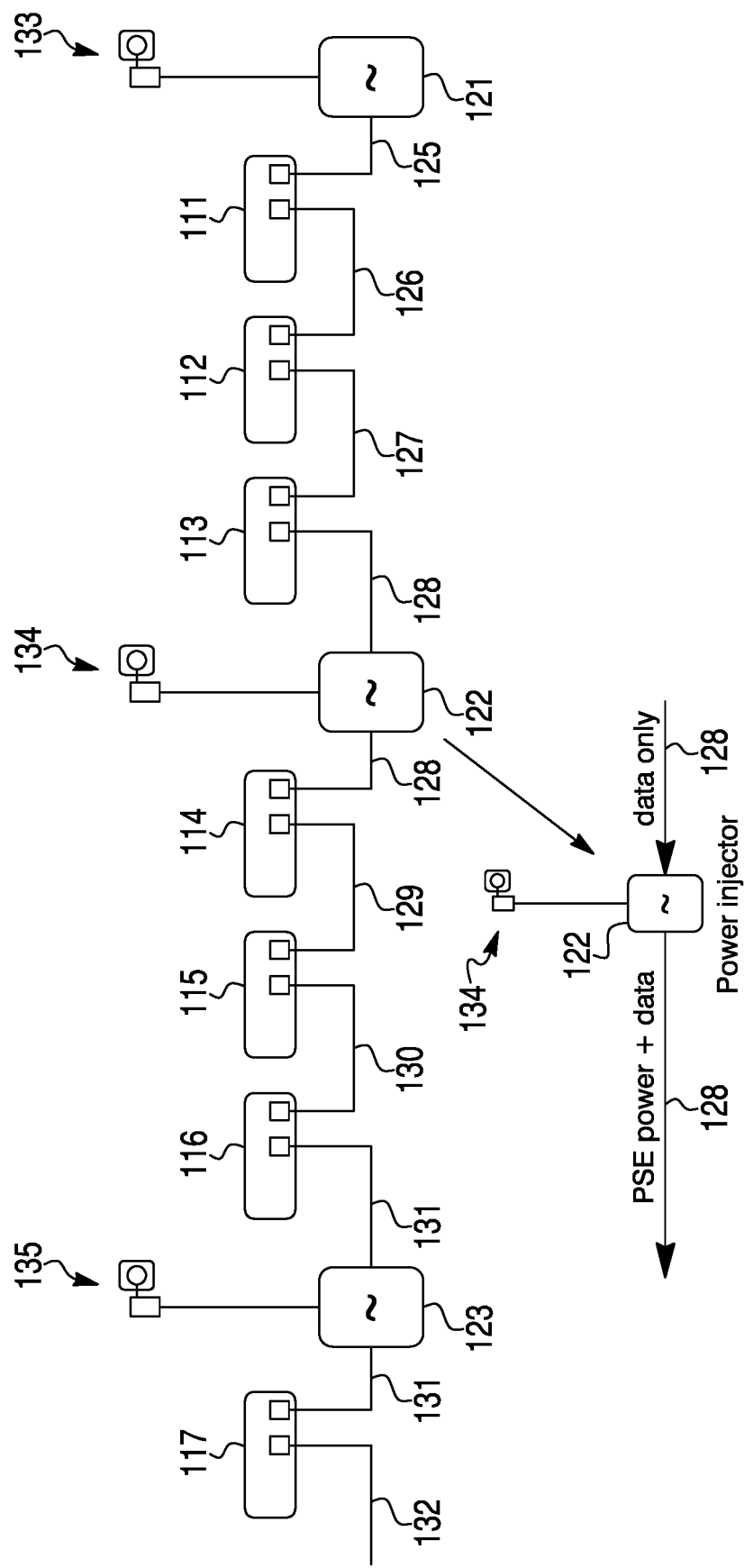
FIG. 9 is a diagram of a daisy-chained power-over-Ethernet nodes with some related art components.

FIG. 9 is a diagram of a daisy-chained power-over-Ethernet nodes with some related art components. Nodes 111, 112, 113, 114, 115, 116 and 117 may be daisy-chained. A power injector 121 may be connected to a wire 125 to node 111, a wire 126 may connect nodes 111 and 112, wire 127 may connect nodes 112 and 113, wire 128 may connect nodes 113 and 114, wire 129 may connect nodes 114 and 115, wire 130 may connect nodes 115 and 116, wire 131 may connect nodes 116 and 117, and wire 132 may be connected to another node.

A power injector 122 may be connected to wire 128. A power injector 123 may be connected to wire 131. A pattern that seems to emerge is a power injector connected between every three nodes. However, the connection of a power injector may situated between any numbers of nodes. There may be a pattern or not. The total number of nodes may be more or less than the number of nodes in FIG. 9. Power injectors 121, 122 and 123 may each be connected to electric power sources 133, 134 and 135, respectively. There may be two-way data communication on lines 125, 126, 127, 128, 129, 130, 131, 132. There may be electric power on lines 125, 126, 127, 128, 129, 130, 131, 132. From a power point of view, nodes 111, 112, 113, 114, 115, 116 and 117 may behave similarly as device of FIG. 12.

FIG. 9 is a diagram that also indicates a basis of power injector 122. There may be two-way data communication on line 128. Data only may be present on line 128 on the right side of injector 122. Power may enter injector 122 from a power source 134. Power may exit injector 122 on line 128 on the left side of injector 122 to power devices down the line from injector 122 plus two way data may be present on the same line. Line 128 on the right side of injector 122 may not be used nor connected anywhere. Other injectors like those of injectors 121 and 123 may function similar to injector 122. Additional power injectors may be distributed along the cable (i.e., lines 125-132 to ensure that a power capacity of the cable is not exceeded even when all the devices run on maximum power. Injectors 121, 122, 123 may be replaced by any device satisfying at least a basis of power injector 122. Mainly injector 121 may be replaced by PoE Ethernet hub or switch like 105 in FIG. 8. A line on the right side of injector 121 may be connected into an Ethernet hub or switch like 105 in FIG. 8 or 75 in FIG. 4 and FIG. 5 or any communication device or may not be connected anywhere. The present configured system and configuration may be used with the architecture shown in FIG. 9.

A FIG. 9A is a diagram similar to FIG. 9 but with injectors 121, 122 and 123 removed and power sources 133, 134 and 135 connected to nodes 111, 114 and 117, respectively.

The diagram of FIG. 9A may also indicate a basis of node 114 when connected to power source 134. There may be two-way data communication on lines 128, and 129. Power may enter node 114 from a power source 134. Power may enter node 114 on line 128 plus two way data may be present on the same line. Power may exit node 114 on line 129 to power devices down the line from node 114 plus two way data may be present on the same line. Line 128 on the right side of node 114 may not necessarily be used nor connected anywhere. Line 129 on the left side of node 114 may not necessarily be used nor connected anywhere. Other nodes with a connection to a power source like those of nodes 111 and 117 may function similarly to node 114. Additional nodes with a connection to power sources may be distributed along the cable (i.e., lines 125-132) to ensure that a power capacity of the cable is not exceeded even when all the devices run on maximum power. Line 125 on the right side of node 111 may be connected into an Ethernet hub or switch like 105 in FIG. 8 or 75 in FIG. 4 and FIG. 5 or any communication device or may not necessarily be connected anywhere. The present configured system and configuration may be used with the architecture shown in FIG. 9A. From a power point of view, nodes 111, 112, 113, 114, 115, 116 and 117 may behave similarly as a device of FIG. 12.

Figure 10:
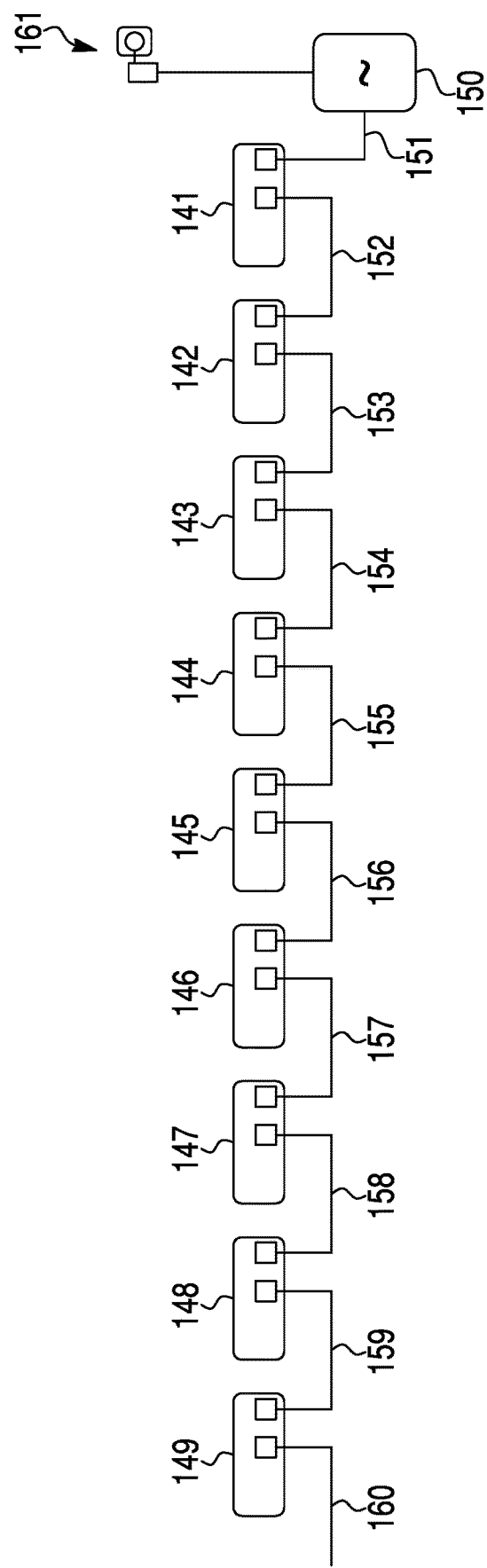
FIG. 10 is a diagram of a daisy-chained power-over-Ethernet with the presently configured system and configuration.

FIG. 10 is a diagram of a daisy-chained power-over-Ethernet with the present configured system and configuration. A device (i.e., an electrical appliance), such as devices 141-149 in FIG. 10, may have power consumption that varies over time, in that it may turn on or off, or the power may increase or decrease. A source of electrical power, such as source 161 and power injector 150, should have a capacity to feed all devices 141-149, even if all the devices run at their maximum or peak power consumption. The Ethernet cable (i.e., lines 151-160) may provide power (i.e., electricity) and data communication. Power capacity of the cable may be highly limited. The capacity may be highly limited even when not all devices run on maximum power, in that if all devices were run at maximum power, the capacity would likely be exceeded with the architecture shown in FIG. 10. From a power point of view, nodes 141, 142, 143, 144, 145, 146, 147, 148 and 149 may behave similarly as device of FIG. 12.

Figure 10A:
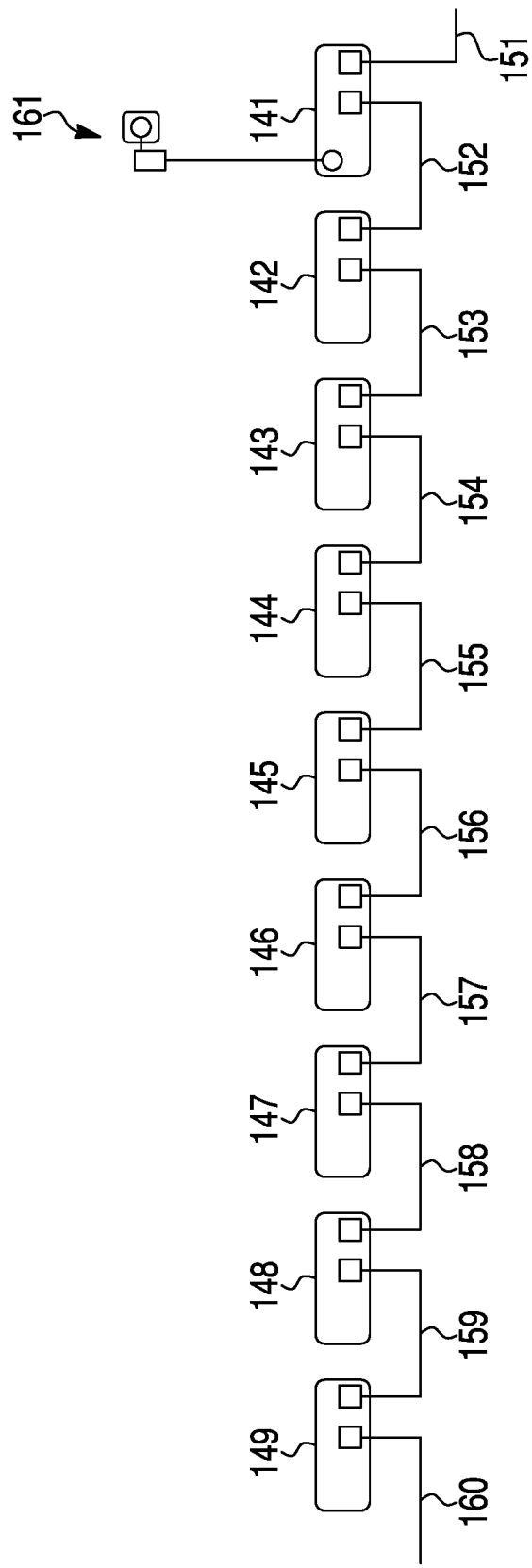
FIG. 10A is a diagram like that of FIG. 10 but with removal of the power injector and providing a connection of the power source to a device.

FIG. 10A is a diagram like that of FIG. 10 but with power injector 150 removed and power source 161 connected to device 141. Device 141 may function similar to node 114 in FIG. 9A. The present configured system and configuration may be used with the architecture shown in FIG. 10A.

Figure 11:
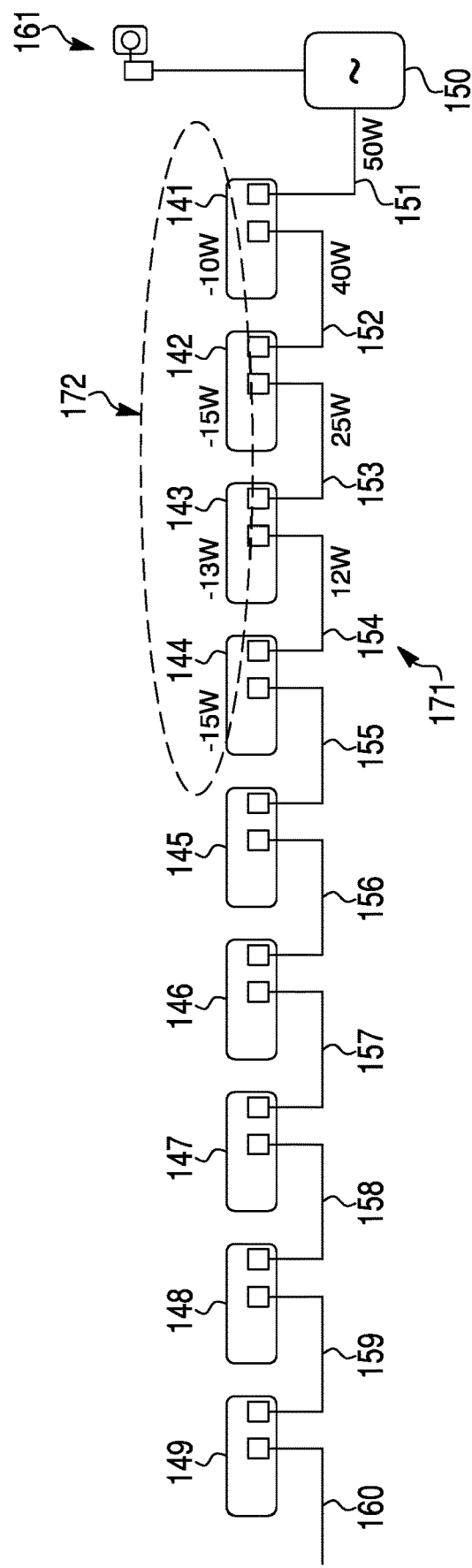
FIG. 11 is a diagram that illustrates a power capacity exceed when power is daisy chained.

FIG. 11 is a diagram that illustrates when power is daisy chained, a device 141 nearest to power source 150 may determine the available power capacity in that device 141 which may be equal or less than available power capacity of power source 150 and equal or less than power limit of Ethernet cable 151 and reserves some portion of the power (e.g., 10 watts) for itself and offers the remainder (e.g., 40 watts) for a subsequent device 142 toward which it behaves as a power source. At some point, all of the power capacity is exhausted at point 171 due to the consumptions of devices 141-144 as indicated by encircled line 172. At point 171, subsequent devices 144-149 cannot begin to consume power, otherwise, the power capacity would be exceeded at least, in power source 150 or line 151. Similar power capacity exhaustion or exceed may happen in any segment of nodes in FIG. 9, for instance for power injector 121 and nodes 111, 112, 113.

Figure 12:
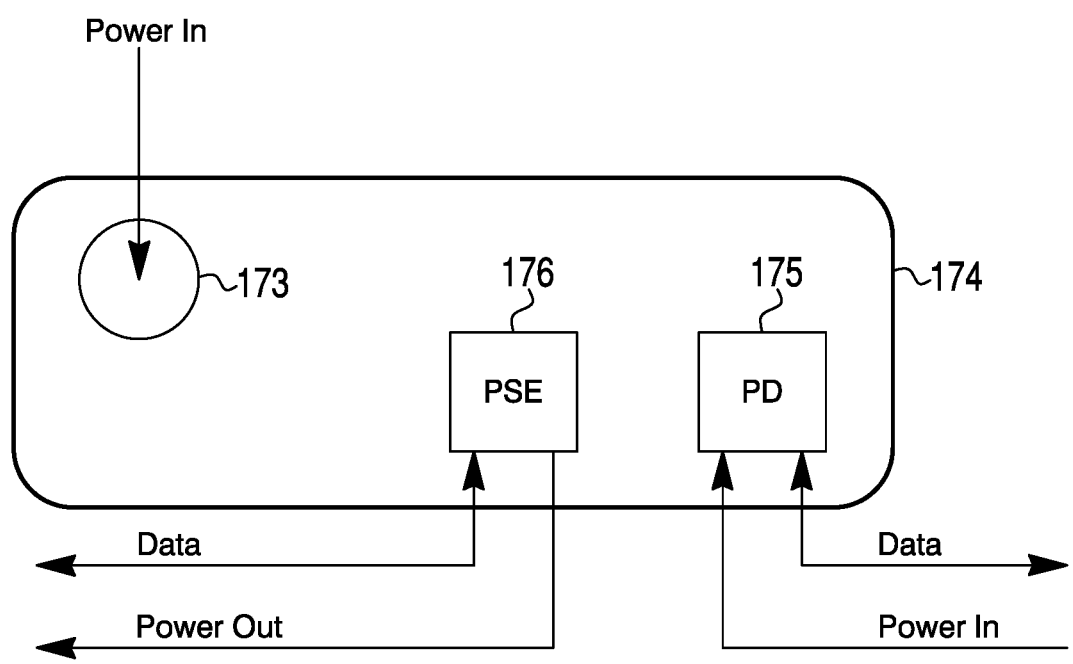
FIG. 12 is a diagram of an example device to illustrate that, from a power point of view, the device behaves as a consuming device or appliance at one port and a power source at another port.

FIG. 12 is a diagram of an example device 174 to illustrate that, from a power point of view, the device behaves as a consuming device or appliance at its right port 175 (PD-powered device) and a power source (PSE-power sourcing equipment) at its left port 176. From the capacity available at PD port 175, device 174 may consume or reserve some part of the power for itself and the remainder part of the power is available at PSE port 176. Power may also be supplied at port 173. If power is supplied at port 173, then the device behaves as a consuming device or appliance at that port and device may cease to consume power from PD port 175. If power is also supplied at port 173, then from sum of capacities available at PD port 175 and port 173 device 174 may consume or reserve some part of the power for itself and the remainder part of the power may be available at PSE port 176.

Figure 13:
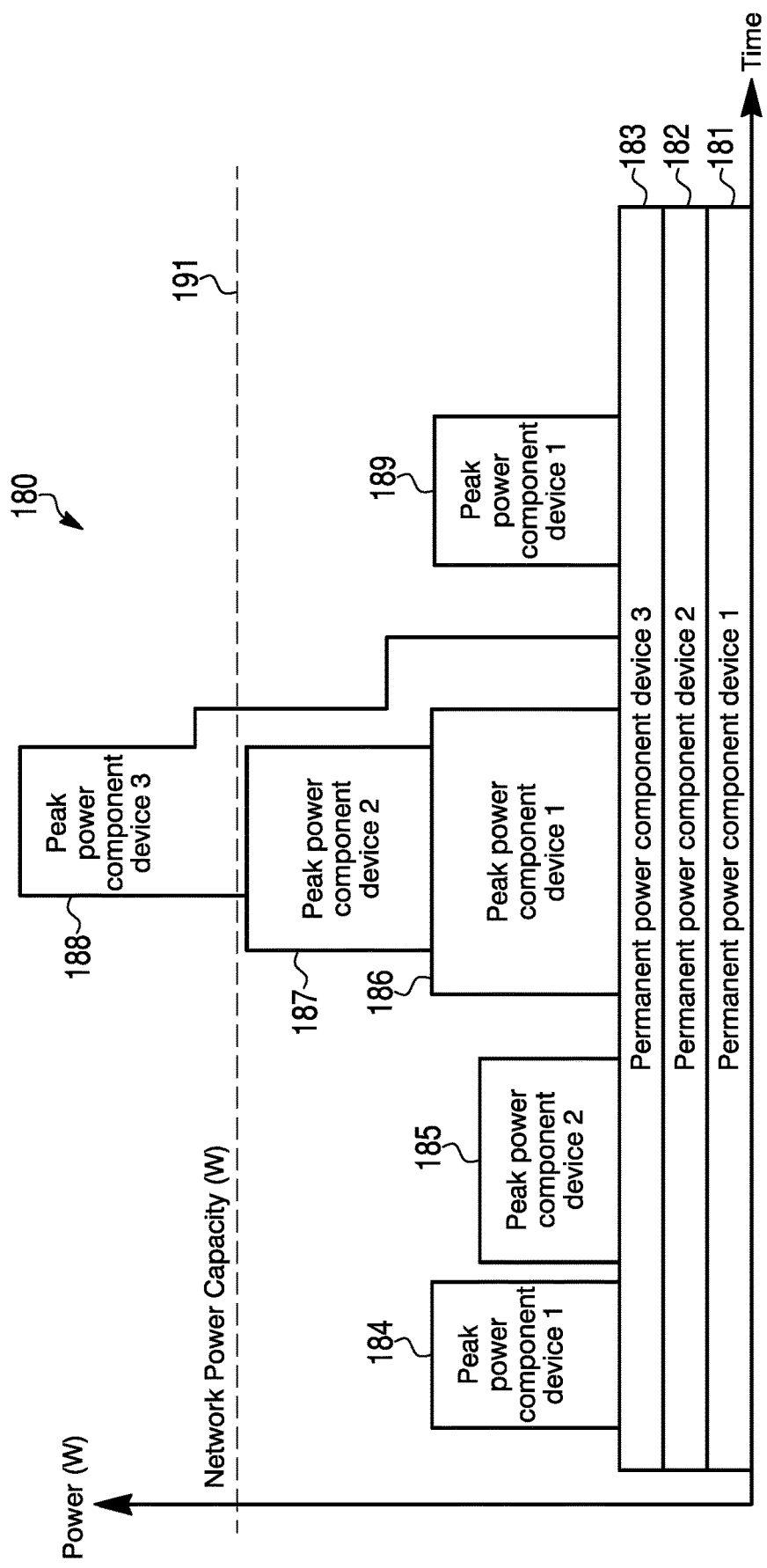
FIG. 13 is a diagram of a graph of power in watts versus time illustrating the power capacity exceed.

FIG. 13 is a diagram of a graph 180 of power in watts versus time. Graph 180 illustrates how power capacity may be exceed with a related art setup. At a base, there may be permanent power components 181, 182 and 183 for devices 1, 2 and 3, respectively. Devices 1, 2 and 3 may be nodes of one segment between two power injectors in FIG. 9, for instance nodes 111, 112, 113 between injectors 121, 122 or first 3 nodes after injector in FIG. 10, for instance nodes 141, 142, 143. Dashed line 191 may reveal a network power capacity. A peak power component 184 of device 1 and peak power component 185 of device 2 may occur at separate times along the time line. After components 184 and 185, a peak power component 186 of device 1 and a peak power component 187 may occur for a period of time at the same time, thus almost reaching the network power capacity of line 191. Further, a peak power component 188 of device 3 may occur during the occurrences of components 186 and 187, thereby greatly exceeding the network power capacity indicated by line 191. Component 187 may cease resulting in a total peak power still over the power capacity of line 191. Subsequently, component 186 ceases, and lastly of the three components 186, 187 and 188, component 188 ceases. Future peak power components may occur such as a peak power component 189 for device 1. These peak power components 184-189 may be superimposed on the total of permanent power components 181-183.

Figure 14:
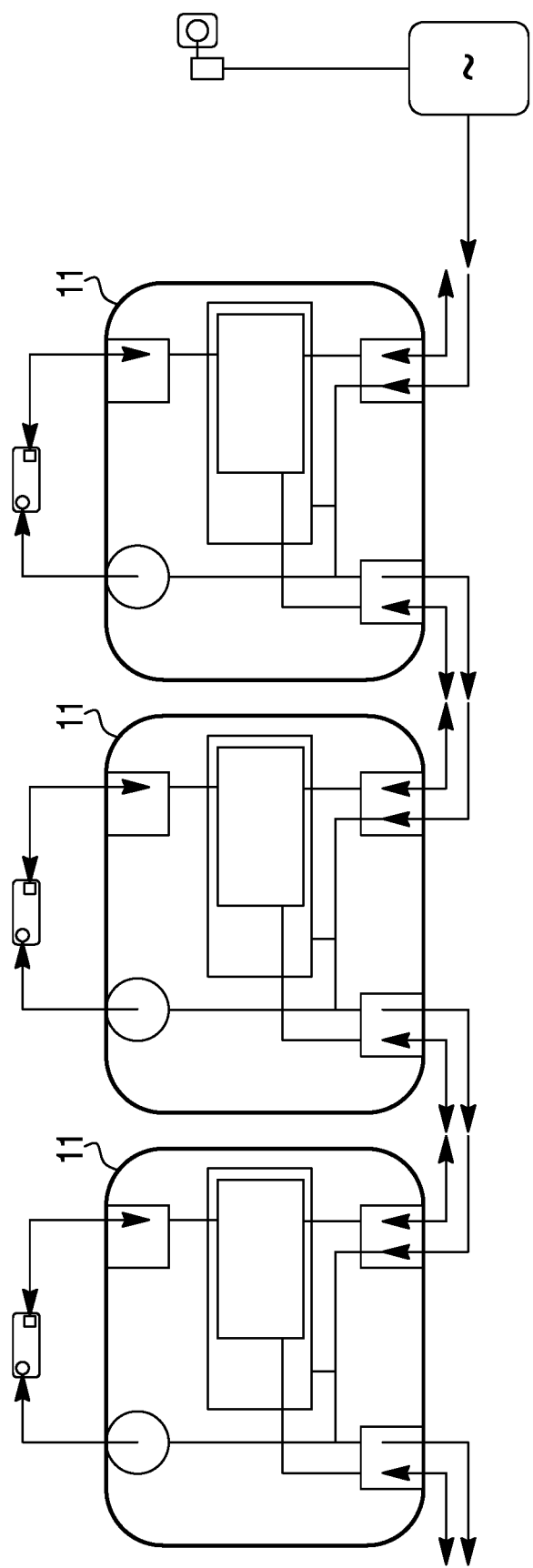
FIG. 14 is a diagram of a daisy chaining of PoE modules.

FIG. 14 is a diagram of a daisy chaining of PoE modules like PoE module 11 of FIG. 1. Two other forms of a PoE module may be PoE module 21 of FIG. 2 and PoE module 41 of FIG. 3. The configuration may be like that shown in FIGS. 10 and 11.

Figure 2B:
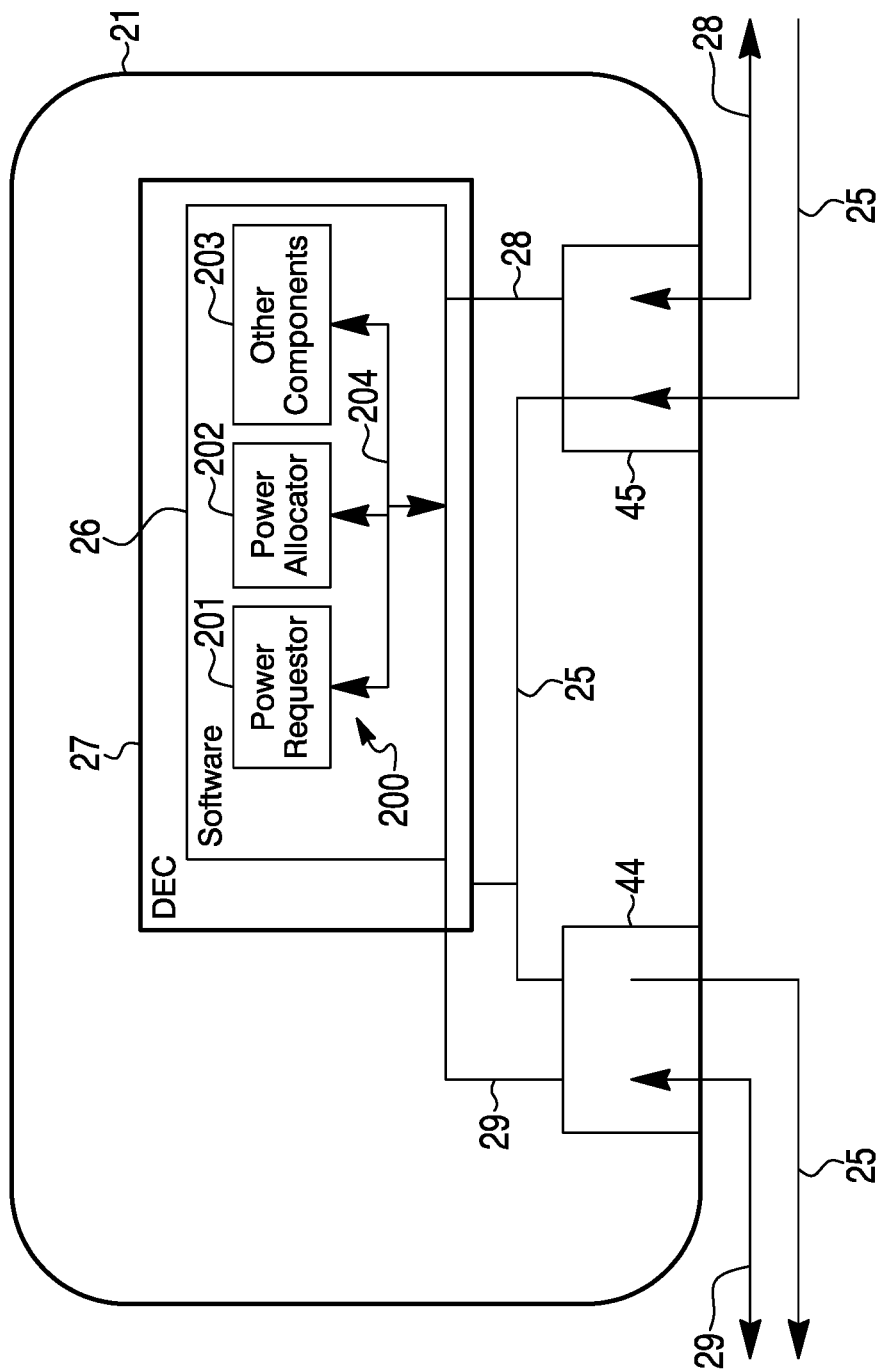
FIG. 2B is a diagram like that of FIG. 2A but with more detail of a software component.
Figure 15:
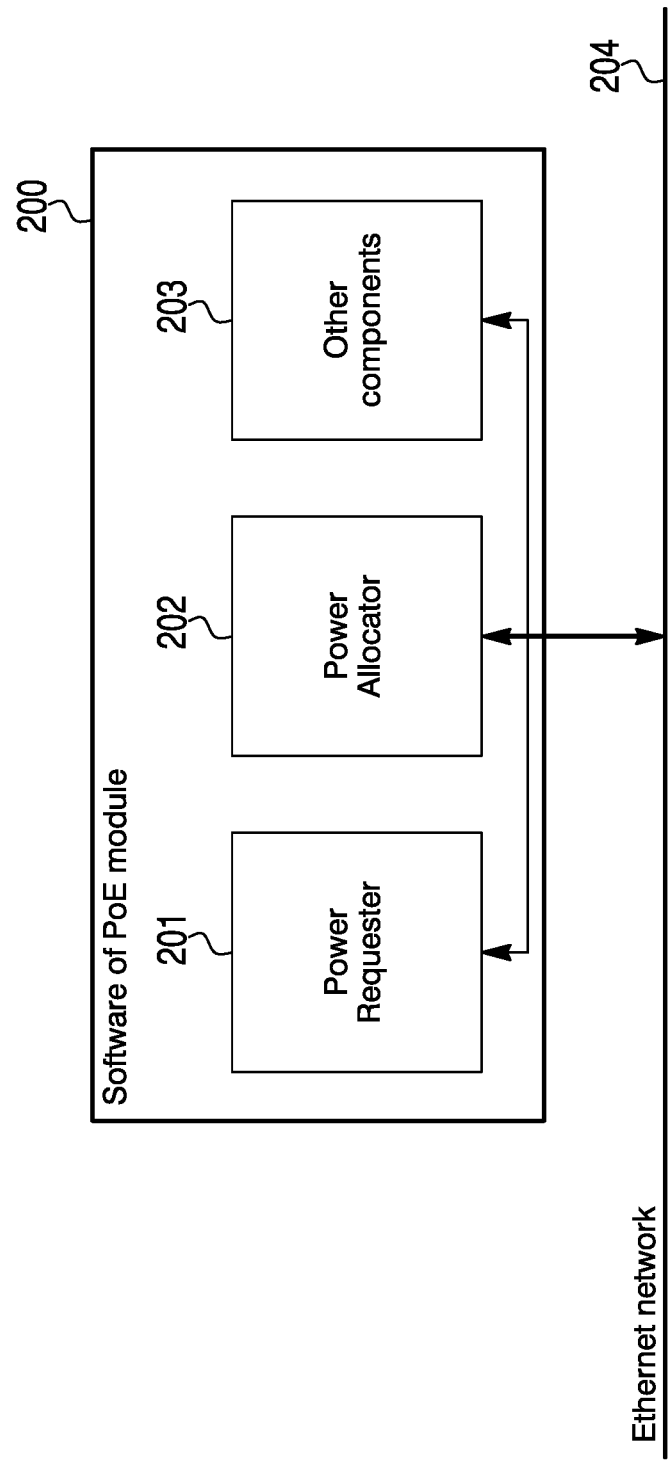
FIG. 15 is a diagram of software components that may be added to the software of the modules.

FIG. 15 is a diagram of software components that may be added to the software of the software components 16, 26 and 56 of PoE modules 11, 21 and 41, respectively. For illustrative purposes, software of a PoE module 200 may incorporate a power requestor 201, a power allocator 202 and other components 203 may be connected to an Ethernet network 204. By way of example, FIG. 2B has a module 200 added to software 26 of DEC 27 of module 21. A similar illustration may be made for modules 11 and 41.

Power requestor 201 may convert a request for power consumption components into a PoE power negotiation protocol and convey them by way of communication over an Ethernet cable to a power allocator 202. By the same way, requestor 201 may receive information from allocator if a power component has been allocated (fully or partially), rejected or postponed. Power allocator 202 may receive requests noted herein from the requestors. Allocator 202 may either allocate (full or partial requested power of power component) or reject or postpone them and inform it about the requestors.

Into an original Ethernet node (i.e., a device behind the PoE module 12, 22, or 52) may be added a part that requests a power consumption component via PoE requestor 201 before it starts to consume and does not start consuming before it is allocated, or this part may be added to other components 203 of software module 200.

Software of each PoE module may contain one power requestor 201, and some or all (at least one) PoE modules in the network power segment may contain one power allocator 202 (only one at a time is active). In this context a network segment is all PoE modules powered form one power capacity pool in which if one device increases its consumption remains less for the others. Example of such network power segment is nodes 111-113 or 114-116 in FIG. 9 or 141-149 in FIG. 10.

Figure 16:
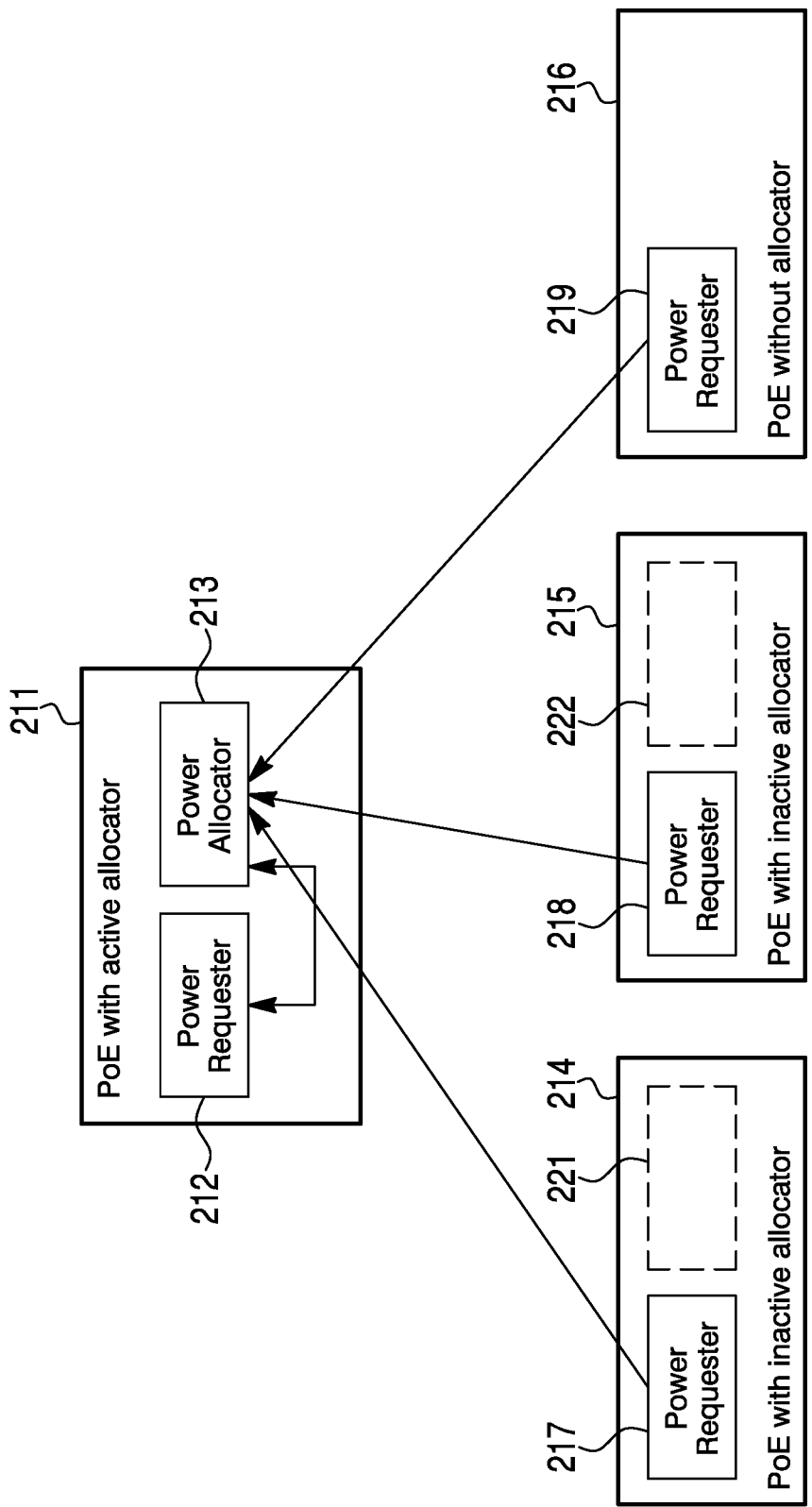
FIG. 16 is a diagram of a logical communication between requestors and one active allocator.

FIG. 16 is a diagram of a logical communication between requestors and one active allocator. A PoE 211 may have a power requestor 212 and a power allocator 213 connected to each other. Power allocator 213 may have a two-way connection with a power requestor 217 at a PoE 214 with an inactive allocator 221, a two-way connection with a power requestor 218 of a PoE 215 with an inactive allocator 222, and a two-way connection with a power requestor 219 of a PoE 216 without an allocator.

Figure 17:
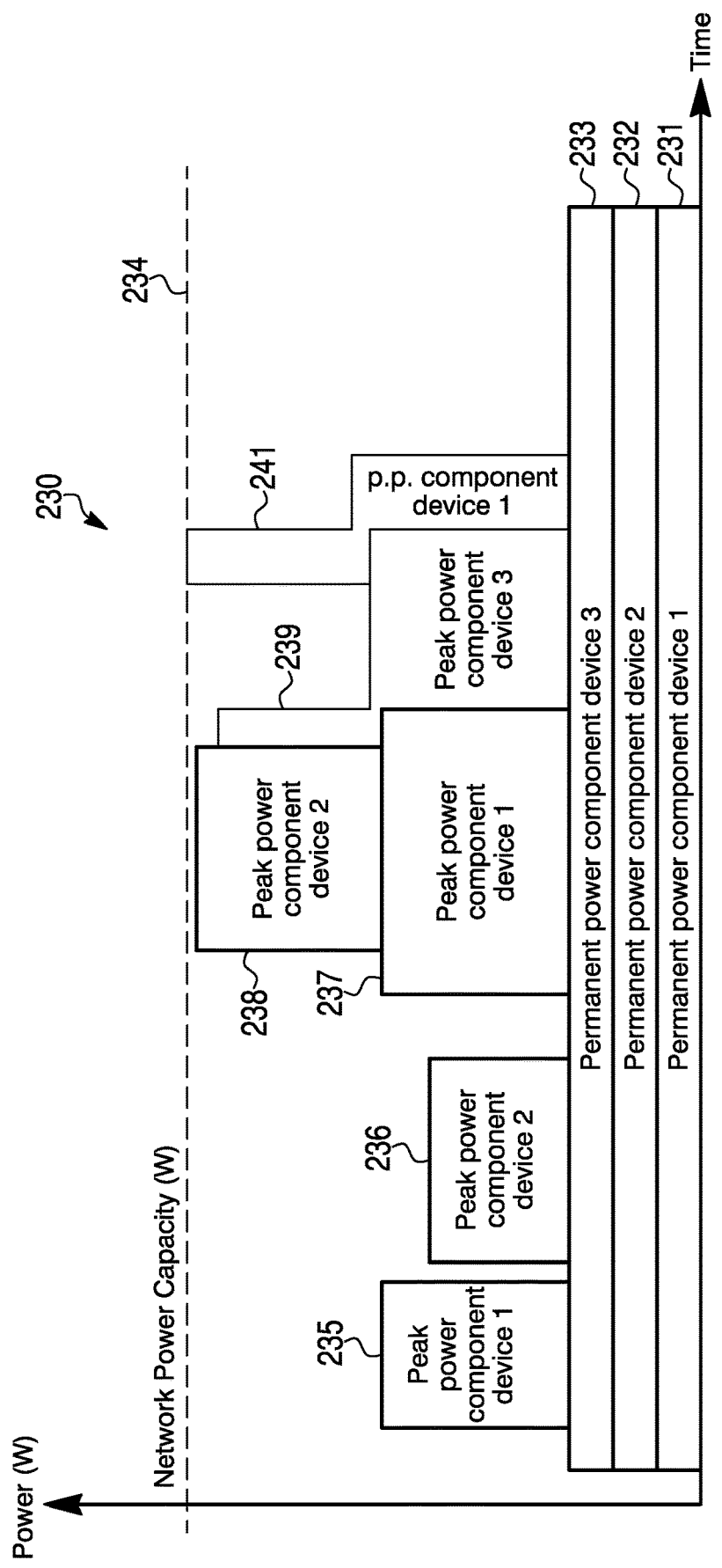
FIG. 17 is a diagram of a graph that illustrates prevention of power capacity being exceeded with the present approach.

FIG. 17 is a diagram of a graph 230 that illustrates prevention of power capacity being exceeded with the present approach. Peak power consumption of all devices in a chain may be scheduled so that network power capacity is not exceeded. FIG. 13 is the diagram of graph 180 of power capacity being exceeded without the present approach.

Graph 230 shows power in watts (W) versus time. There may be a graphed permanent power component 231 of a device 1, a permanent power component 232 of a device 2, and a permanent power component 233 of a device 3. A network power capacity is indicated by a dashed line 234 in graph 230. There may be a peak power component 235 for device 1 and a peak power component 236 for device 2. Components 235 and 236 occur at separate times and do not overlap each other. Components 235 and 236 are superimposed on components 231, 232 and 233. The magnitude of components 235 and 236 do not exceed the network power capacity as indicated by line 234. Another peak power component 237 for device 1 may occur superimposed on components 231-233. A peak power component 238 for device 2 may occur superimposed on peak power component 237. Component 238 does not exceed the network power capacity of line 234. A peak power component 239 for device 3 may occur on peak power component 237 just at a time that peak power component 238 shuts down.

Power peak component 239 does not exceed the network power capacity level 234 while superimposed on peak power component 237. When peak power component 237 shuts down, component 239 is no longer superimposed on component 237 and drops to being superimposed only on the permanent power components 231-233. However, sometime later, a peak power component 241 for device 1 occurs and is superimposed on component 239 for a period that component 239 is present. At that time, the peak of component 241 appears at the network power capacity line 234. After component 239 ceases, then the relative magnitude of component 241 falls to where component 241 is superimposed just on permanent power components 231-233.

Figure 18:
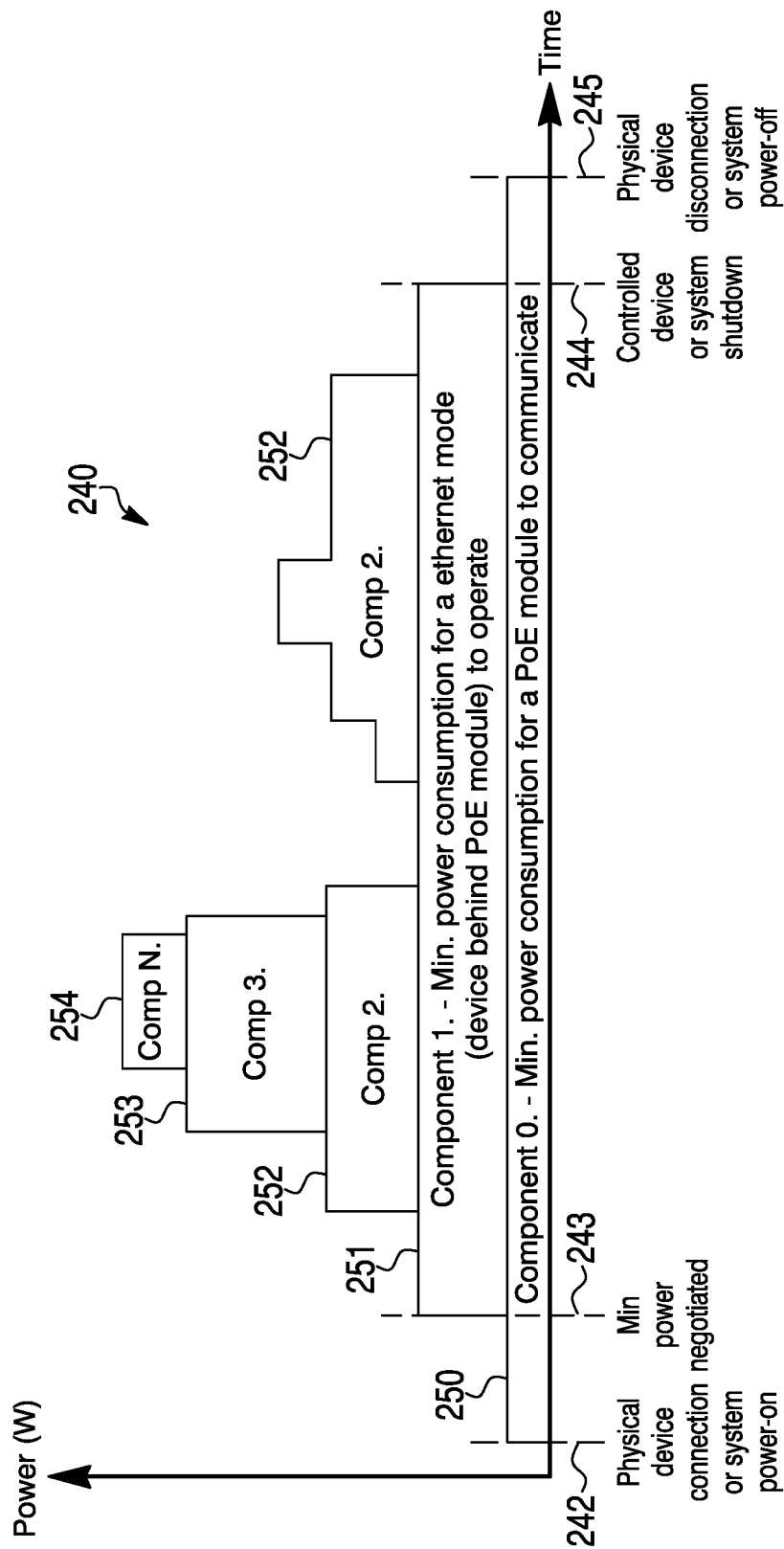
FIG. 18 is a diagram of a graph of power in watts versus time that may relate to a negotiation of power components.

FIG. 18 is a diagram of a graph 240 of power in watts versus time. Graph 240 may relate to a negotiation of power components. A device in the network may negotiate an allocation of more power components independently as the device may have inside more logical electrical appliances that may operate independently. A sum of all currently allocated power components is a maximum allowed power consumption of the device.

A component 250 represents minimum power consumption for a PoE module to communicate. A physical device connection or system power-on may occur at time mark 242. Component 250 may be the only component whose consumption starts before it is allocated. It is the minimum power necessary for a PoE module to do the negotiation. Mostly, it is consumption of a PoE module.

A component 251 may be a minimum power besides component 250 for the device to operate. Component 251, in other words, is minimum power consumption for an Ethernet node (a device behind the PoE module) to operate. Time mark 243 may be where minimum power to negotiate starts. Component 251 may be negotiated first, before the consumption starts. If the sum of components 250 and 251 of devices in the network is higher than the power capacity of the network, then it is considered a system malfunction.

A time mark 244 at an end of component 251 may indicate a controlled device or system shutdown. A time mark 245 at an end of component 251 may be a physical device disconnection or a system power-off.

Components 252, 253, 254 and higher may be allocated and given up during normal operation. Components 250, 251, 252, 253 and 254 correspond to components 0, 1, 2, 3 and N, respectively.

Figure 19:
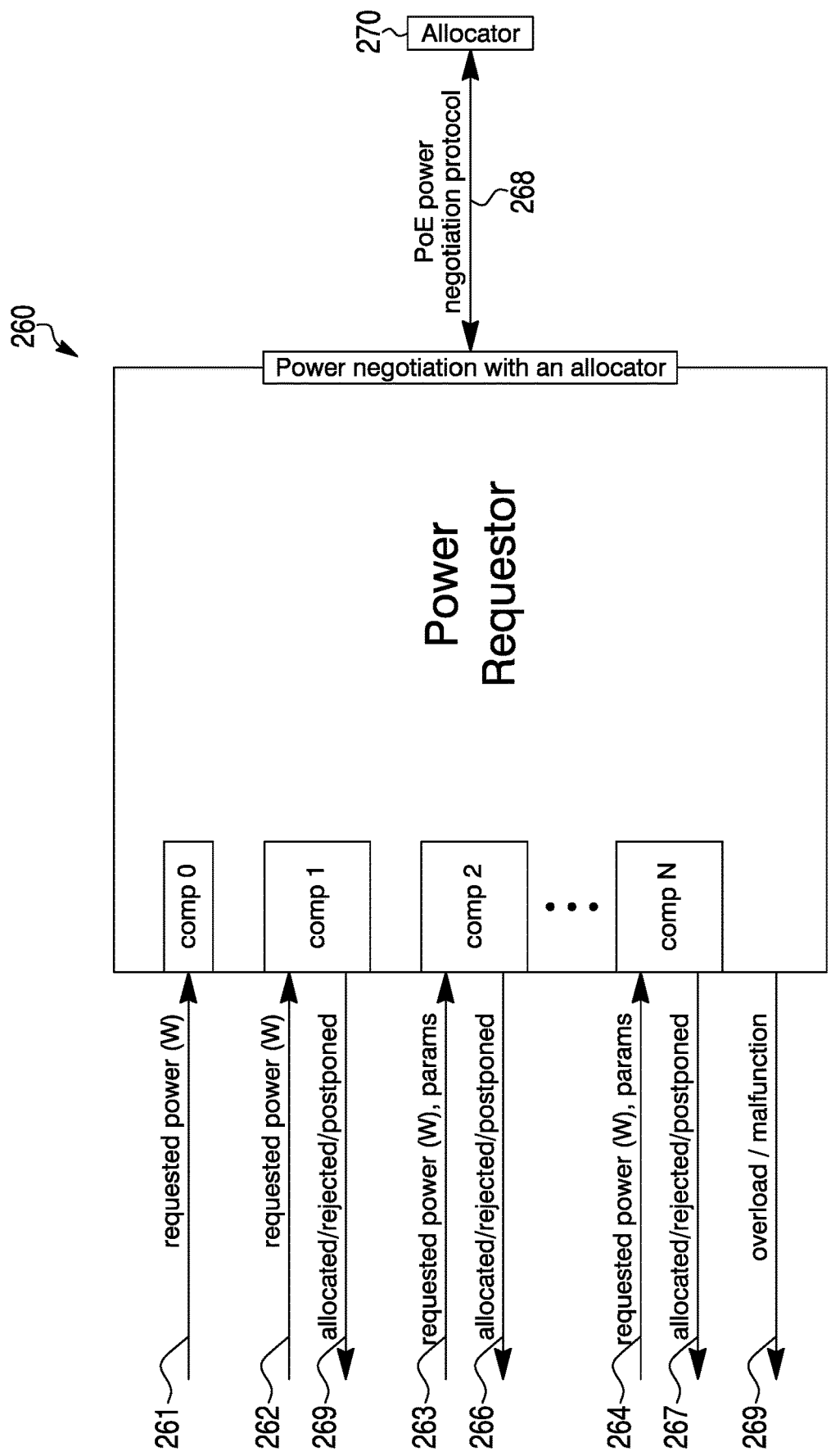
FIG. 19 is a diagram of a power requestor.

FIG. 19 is a diagram of a power requestor 260. A description of requestor 260 may be noted. There may be a requested power (W) input 261, a requested power (W) input 262, a requested power (W) params input 263, and a requested power (W) params input 264, respectively, to component 0, component 1, component 2, and component N of requestor 260. There may be an allocated/rejected/postponed output 265, an allocated/rejected/postponed output 266, and an allocated/rejected/postponed output 267, respectively, from component 1, component 2, and N component of requestor 260. Also, there may be an overload/malfunction 269 from requestor 260. There may be a two-way connection 268 between requestor 260 and allocator 270 for power negotiation of power requestor 260 with power allocator 270. Connection 268 may utilize a PoE power negotiation protocol.

To reiterate, requestor 260 may convert requests for power consumption components (left) into the power negotiation protocol (right) and convey them by means of communication over the Ethernet cable to power allocator 270. By the same means, requestor 260 may receive information from allocator 270 if the power component has been allocated rejected or postponed (i.e., will be allocated later) and may set the state output (left) of the respective component into the respective state allocated/rejected/postponed.

Requested power (W) may be only requested power in watts with no other parameters and in a normal state should be allocated quickly, not rejected or postponed. In case of component 0, anything other than immediate allocation leads to overload/malfunction signalization.

Requested power (W) params may ether be requested power-in watts which will be allocated/rejected/postponed. Or a range of power which, when allocated, will additionally signalize a power level (in a requested range) that has been allocated. It may contain optional parameters that tell the allocator which power component is needed earlier, and so forth, and allow the optional decision which component to allocate immediately and which to postpone.

Parameters of requested power component may be noted. Power (W) or range of power, if is not needed at all, a device may set it to zero. It may change in time, but if increased, the device should wait until it is allocated again before the real consumption increases.

Priority may be how much and how soon is the allocation needed. It may change in time. If the power is not allocated immediately, the device may increase it so long until it is eventually allocated. If the power is almost not needed, then the device may decrease it considerably instead of setting the power to zero.

There may be an estimated time of consumption or consumptions, or energy to be consumed (Wh).

Interruption costs may be if the allocation of a power component can be interrupted unilaterally by the allocator and the costs (i.e., problems, wear, and so on) that it causes to the device.

Efficiency versus power level (only for range of power) may be how efficient the device is at different power levels.

Parameters that don't change in time may be preset in allocator and therefore not communicated from requestor to allocator.

FIG. 20 is a diagram of power allocator 270. There may be a network power capacity (W) input 271 to and an overload/malfunction output 272 from allocator 270. There may be power negotiation with power requestors, such as power requestor 260. Power allocator 270 may have any number of two-way connections 273, 274 and 275, using PoE power negotiation protocols with a first requestor 1, requestor 2, and so on, with requestor N, respectfully, which resemble power requestor 260. N may be any number.

There may be rules relative to decisions by an allocator like power allocator 270. A power component may be allocated if it has a smaller power (W) requested, a higher priority, a lower estimated time of consumption or consumptions, or energy to be consumed, lower interruption costs, or and in case of a range of power requested, a power level of highest efficiency may be allocated.

A power component allocation may be interrupted/withdrawn by the allocator if it has higher power (W) requested, lower priority, higher estimated time of consumption or consumptions, or energy to be consumed (Wh), lower interruption costs, or and in case of range of power requested currently allocated power level is in a point of low efficiency.

For a range of power only the following decisions may apply. An allocated power level may be increased if smaller power is requested, there is higher priority, lower estimated time of consumption or consumptions or energy to be consumed (Wh), lower interruption costs, and/or currently allocated power level is below a point of highest efficiency.

The allocated power level may be decreased if there is higher power (W) requested, lower priority, a higher estimated time of consumption or consumptions, or energy to be consumed (Wh), higher interruption costs, or a currently allocated power level is above a point of highest efficiency. The above rules may be such so that the network power capacity (W) is never exceeded.

What the present system has may be noted. The system may be adding a power requestor and allocator into software in DEC 17, 27, 57 of PoE module 11, 21, 31, respectively.

The present system may include the following highlights. Peak power consumption of all devices in the network may be scheduled so that the network power capacity is never exceeded. Devices or PoE modules in a daisy-chained PoE network may negotiate between or among themselves when, who and how much will consume so that the power capacity is not exceeded but that the intended behavior of all devices is optimal, and suffers least, from all possible alternatives that can be achieved with the limited power capacity. One device in the daisy-chained PoE network may take on a role of the controller (arbiter) and use mathematical methods or algorithms to calculate when, who, and what other devices in the network should do, so that the power capacity is not exceeded but that the intended behavior of all devices is optimal, and suffers least, from all possible alternatives that can be achieved with the limited power capacity.

To recap, a daisy chained power and communication system may incorporate a plurality of nodes and one or more power sources connected to one or more of the plurality of nodes. A consumption of the plurality of nodes before or without a consumption scheduling may be more or less than, or equal to a full capacity of the one or more power sources. The plurality of nodes may have a daisy chain configuration, although the plurality of nodes consists of one or more daisy chains, each daisy chain has one or more power sources connected to one or more nodes, respectively, among the plurality of nodes. The nodes may incorporate modules having consumption scheduling to prevent the consumption of the plurality of nodes from exceeding the total capacity of the one or more power sources available to the plurality of nodes. Each daisy chain configuration of the plurality of nodes may allow communication of signals from one node to another node of a respective daisy chain.

A PoE module may operate as a power source. The PoE module may acquire information about a node's permanent and peak power consumption quantities. Consumption schedules may be applied to the nodes so as to prevent their exceeding the PoE maximum available power.

The PoE module may run firmware to provide the scheduling of consumption by the nodes.

One module may provide the scheduling.

If all nodes run at their maximum or peak power consumption at one time, then the capacity of the power source may be exceeded.

Each node may operate as a consuming device at a first port and as a power source at a second port. From power available at the first port, the node may consume or receive some of the power, which reduces the power capacity, and a remainder of the power, if any, that is available at the second port. Alternatively, one or more nodes may have their own power source in which case may or may not consume power from the first port, and a node having its own power source may not necessarily have a first port.

The power consumed or reserved by one or more nodes of the plurality of nodes, in total at the same time, does not necessarily exceed the PoE maximum power because of the scheduling of consumption or reservation of power of the nodes, by the firmware of the module.

Each node of the plurality of nodes may incorporate a power requestor. The power requestor may convert a request for power to a PoE power negotiation protocol and convey the request over the Ethernet to a power allocator. The power requestor may receive information from the power allocator as to whether the power requested has been allocated, rejected or postponed.

At least one of the plurality of nodes or power sources may have a power allocator and only one allocator at a time may be active.

An N node may operate as a consuming device at a first port and as a power source at a second port. The second port may be connected to a first port of an N+1 node, and a second port of the N+1 node may be connected to a first port of an N+2 node, and so on in a systematic pattern up to a first port of an N+n node. The N+n node may be the last node of a segment of a daisy chain. Alternatively, one or more nodes may have their own power source in which case may or may not consume power from the first port, and a node having its own power source may not necessarily have a first port.

An output of the power source or node may be connected to the first port of the N node, and N may be a predetermined numeral. Alternatively, one or more nodes may have their own power source in which case may or may not consume power from the first port, and a node having its own power source may not necessarily have a first port.

The power allocator may develop information as to whether the power requested has been allocated, rejected, postponed, or allocated at an amount different than the amount requested, according to a set of rules. The set of rules may prevent a network power capacity from being exceeded.

A number of nodes in the plurality of nodes covered by one daisy chain PoE versus a plurality of daisy chain POE's may increase 2 to 5 times for pump actuators, 2 to 20 times for valve actuators, or a number of power injectors may decrease 2 to 5 times for pumps, and eliminate a need for valves.

An approach for building a daisy chain of nodes, may incorporate constructing two or more nodes, and connecting the two or more nodes together in a daisy chain to form a line of communication and scheduled power for each of the two or more modes. Each node may operate as a consuming device at a first port of the nodes and as a power source at a second port of the nodes. From a power capacity available at the first port, the node may consume or reserve some of the power, and a remainder of the power, if any, may be available at the second port, and a power consumption of the two or more nodes may be less than or equal to a network power capacity. Alternatively, one or more nodes may have their own power source in which case may or may not consume power from the first port, and a node having its own power source may not necessarily have a first port.

A power supply may have an output connected to the first port of a node at a beginning of the daisy chain.

Each module may incorporate a power requestor to convey a request for power to a power allocator. The power allocator may respond with an allocation, rejection or postponement of the request for power. The power allocator may respond according to a set of rules that prevents network power capacity from being exceeded.

A load shedding daisy chained power over an Ethernet (PoE) network may incorporate two or more components connected as a daisy chain, and a power supply of a PoE connected to a component of the daisy chain. The daisy chain of the two or more components may convey communication signals. Controlling a number of the two or more components consuming power may assure that a peak consumption of the network is less than or equal to a peak power consumption capacity of the power supply of the PoE. The components may be scheduled when to run so that the simultaneous total of the power used by components does not exceed the peak power consumption capacity of the power supply of the PoE.

The network may further incorporate a module that runs firmware which does computations, and communicates with components and modules in the network, to effect scheduling power for the components and modules.

One or more components may be pumps or actuators or sensors of a hydronics system.

One or more of the components may be HVAC components. Thermal inertia of a building may prescribe consumption scheduling of HVAC components. Alternatively, the HVAC components may be schooled when to run to minimize costs of consumption of power.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A daisy chained power and communication system comprising:
   a plurality of nodes;
   one or more power sources connected to one or more of the plurality of nodes; and
   wherein:
   each node of the plurality of nodes operates as a consuming device at a first port of the node and as a power providing device at a second port of the node;
   one or more of the plurality of nodes have their own power source so they don't consume power from the first port;
   a node of the plurality of nodes having its own power source does not have the first port; and
   a total power consumption of the plurality of nodes before or without a power consumption scheduling can be more or less than, or equal to a full capacity of the one or more power sources;
   wherein:
   when all nodes run at their maximum or peak power consumptions at one time, then the full capacity of the one or more power sources is exceeded;
   the plurality of nodes has a daisy chain configuration, although the plurality of nodes consist of one or more daisy chains, each daisy chain connects three or more nodes of the plurality of nodes and has one or more power sources connected to one or more of the three or more nodes, respectively, among the plurality of nodes;
   the plurality of nodes comprise PoE modules having consumption scheduling, which schedule two or more of the plurality of the nodes to run at their maximum or peak power consumptions at different times, based on priorities, estimated time of energy to be consumed, interruption costs or power efficiencies, to prevent the total power consumption of the plurality of nodes from exceeding the full capacity of the one or more power sources available to the plurality of nodes; and
   each daisy chain of the plurality of nodes allows communication of signals from one node to another node of the respective daisy chain.

2. The system of claim 1, wherein:
   a PoE module operates as a power source;
   the PoE module acquires information about a node's permanent and peak power consumption quantities; and
   consumption schedules are applied to the nodes so as to prevent their exceeding a PoE maximum available power.

3. The system of claim 2, wherein the PoE module runs firmware to provide a scheduling of consumption by the nodes.

4. The system of claim 1, wherein one PoE module provides the scheduling.

5. The system of claim 4, wherein:
   each node operates as a consuming device at a first port and as a power source at a second port; and
   from power available at the first port, the node consumes or receives some of the power, which reduces the power capacity, and a remainder of the power, if any, that is available at the second port; or,
   alternatively, one or more nodes have their own power source in which case may or may not consume power from the first port; and
   a node having its own power source may not necessarily have a first port.

6. The system of claim 5, wherein the power consumed or reserved by one or more nodes of the plurality of nodes, in total at the same time, does not exceed the PoE maximum power because of scheduling of consumption or reservation of power of the nodes, by firmware of the PoE module.

7. The system of claim 6, wherein:
   each node of the plurality of nodes comprises a power requestor;
   the power requestor converts a request for power to a PoE power negotiation protocol and conveys the request over an Ethernet to a power allocator; and
   the power requestor receives information from the power allocator as to whether the power requested has been allocated, rejected or postponed.

8. The system of claim 7, wherein at least one of the plurality of nodes or power sources has a power allocator and only one allocator at a time is active.

9. The system of claim 1, wherein:
an N node operates as a consuming device at a first port and as a power source at a second port;
the second port is connected to a first port of an N+1 node, and a second port of the N+1 node can be connected to a first port of an N+2 node, and so on in a systematic pattern up to a first port of an N+n node; and
the N+n node is a last node of a segment of a daisy chain; or
one or more nodes have their own power source in which case may or may not consume power from the first port; and
a node having its own power source may not necessarily have a first port.

10. The system of claim 9, wherein:
an output of the power source or node is connected to the first port of the N node; and
N is a predetermined numeral; or
one or more nodes may have their own power source in which case may or may not consume power from the first port; and
a node having its own power source may not necessarily have a first port.

11. The system of claim 7, wherein:
the power allocator develops information as to whether the power requested has been allocated, rejected, postponed, or allocated at an amount different than the amount requested, according to a set of rules; and
the set of rules prevents a network power capacity from being exceeded.

12. A method for building a daisy chain of nodes, comprising:
constructing three or more nodes;
connecting the three or more nodes together in a daisy chain along a cable to form a line of communication and scheduling power supplied from one or more power sources for each of the three or more nodes; and
wherein:
each node operates as a consuming device at a first port of the node and as a power providing device at a second port of the node;
from a power available at the first port, the node consumes or reserves some of the power, and a remainder of the power, if any, is available at the second port, wherein when all nodes run at their maximum or peak power consumption at one time, then a network power capacity, which depends on a full capacity of the one or more power sources, is exceeded; and
power consumptions of at least two of the nodes are scheduled at different times so a total power consumption of the three or more nodes is less than or equal to the network power capacity, wherein the scheduling is based on priorities, estimated time of energy to be consumed, interruption costs or power efficiencies;
one or more of the three or more nodes have their own power source so they don't consume power from the first port; and
a node of the three or more nodes having its own power source does not have the first port.

13. The method of claim 12, wherein a power supply has an output connected to the first port of a node at a beginning of the daisy chain.

14. The method of claim 13, wherein:
each node comprises a power requestor to convey a request for power to a power allocator;
the power allocator responds with an allocation, rejection or postponement of the request for power; and
the power allocator responds according to a set of rules that prevents the network power capacity from being exceeded.

15. A load shedding daisy chained power over an Ethernet (PoE) network comprising:
three or more components connected as a daisy chain;
a power supply of a PoE connected to a component of the three or more components of the daisy chain; and
wherein:
the daisy chain of the three or more components conveys communication signals;
each component of the three or more components operates as a consuming device at a first port of the component and as a power providing device at a second port of the component;
one or more of the three or more components have their own power source so they don't consume power from the first port;
a component of the three or more components having its own power source does not have the first port;
controlling a number of the three or more components consuming power to assure that a peak consumption of the three or more components is less than or equal to a peak power consumption capacity of the power supply of the PoE, wherein when all nodes of the three or more components run at their maximum or peak power consumption at one time, then the peak power consumption capacity of the power supply of the PoE is exceeded; and
at least two of the three or more components are scheduled at different times to run, based on priorities, estimated time of energy to be consumed, interruption costs or power efficiencies, so that the peak consumption of the three or more components does not exceed the peak power consumption capacity of the power supply of the PoE.

16. The network of claim 15, further comprising a PoE module that runs firmware which does computations, and communicates with components and modules in the network, to effect scheduling power for the components and modules.

17. The network of claim 15, wherein one or more components are pumps or actuators or sensors of a hydronics system.

18. The network of claim 15, wherein:
one or more of the components are HVAC components; and
thermal inertia of a building prescribes consumption scheduling of HVAC components; or
the HVAC components are schooled when to run to minimize costs of consumption of power.

* * * * *